(12) United States Patent
Lipfert et al.

(10) Patent No.: US 11,026,058 B2
(45) Date of Patent: Jun. 1, 2021

(54) TRANSMITTER NETWORK PROVIDED WITH AT LEAST TWO TRANSMITTERS, TRANSMITTER IN THE TRANSMITTER NETWORK AND RECEIVER IN THIS TRANSMITTER NETWORK

(71) Applicant: INSTITUT FUR RUNDFUNKTECHNIK GMBH, Munich (DE)

(72) Inventors: Hermann Lipfert, Oberhaching (DE); Clemens Kunert, Unterfoehring (DE); Swen Petersen, Munich (DE); Ahmad El Malek, Munich (DE)

(73) Assignee: Institut Fur Rundfunktechnik GMBH, Munich (DE)

( * ) Notice: Subject to any disclaimer, the term of this patent is extended or adjusted under 35 U.S.C. 154(b) by 0 days.

(21) Appl. No.: 16/462,893

(22) PCT Filed: Dec. 19, 2017

(86) PCT No.: PCT/EP2017/083500
§ 371 (c)(1),
(2) Date: May 21, 2019

(87) PCT Pub. No.: WO2018/114922
PCT Pub. Date: Jun. 28, 2018

(65) Prior Publication Data
US 2019/0306670 A1    Oct. 3, 2019

(30) Foreign Application Priority Data

Dec. 19, 2016   (IT) .................. 102016000128328

(51) Int. Cl.
*H04W 4/06* (2009.01)
*H04W 88/12* (2009.01)
*H04W 84/12* (2009.01)

(52) U.S. Cl.
CPC ............ *H04W 4/06* (2013.01); *H04W 88/12* (2013.01); *H04W 84/12* (2013.01)

(58) Field of Classification Search
None
See application file for complete search history.

(56) References Cited

U.S. PATENT DOCUMENTS

| 8,660,049 B2 * | 2/2014 | Katayama ............. H04L 5/0032 370/312 |
| 10,313,143 B1 * | 6/2019 | Sevindik ............. H04L 12/1881 |

(Continued)

FOREIGN PATENT DOCUMENTS

| WO | 2009/130541 A1 | 10/2009 |
| WO | 2016/163850 A1 | 10/2016 |

OTHER PUBLICATIONS

International Search Report dated Feb. 12, 2018, issued in PCT Application No. PCT/EP2017/083500, filed Dec. 19, 2017.

(Continued)

*Primary Examiner* — Christopher T Wyllie
(74) *Attorney, Agent, or Firm* — Workman Nydegger

(57) ABSTRACT

A transmitter network is provided with at least two transmitters which transmit in a same frequency range. In a unicast-transmission mode of the transmitter, the transmitters transmit unicast information packets (UC) in subsequent first time intervals. The at least two transmitters further simultaneously transmit in a broadcast mode or multicast mode, respectively, broadcast- or multicast information (BC/MC) in second time intervals that lie in between first time intervals, the broadcast information or multicast information, respectively, transmitted by the transmitters in a second time interval being substantially equal and being transmitted by the transmitters substantially time synchro- (Continued)

nous. The invention also relates to a transmitter and a receiver in the transmitter network.

46 Claims, 18 Drawing Sheets

(56) References Cited

U.S. PATENT DOCUMENTS

| | | | | |
|---|---|---|---|---|
| 2007/0293229 A1* | 12/2007 | Khan | ................. | H04W 72/005 |
| | | | | 455/450 |
| 2008/0089312 A1* | 4/2008 | Malladi | ............... | H04L 27/2613 |
| | | | | 370/345 |
| 2008/0240049 A1* | 10/2008 | Gaur | .................... | H04W 72/10 |
| | | | | 370/338 |
| 2008/0268887 A1* | 10/2008 | Jansen | ................... | H04B 7/022 |
| | | | | 455/503 |
| 2009/0279427 A1* | 11/2009 | Ji | ...................... | H04W 74/0816 |
| | | | | 370/230 |
| 2010/0315963 A1* | 12/2010 | Jading | ............... | H04W 36/0007 |
| | | | | 370/252 |
| 2011/0058512 A1* | 3/2011 | Koo | .................... | H04W 72/005 |
| | | | | 370/312 |
| 2011/0134808 A1* | 6/2011 | Thyni | ................. | H04L 65/4076 |
| | | | | 370/270 |
| 2013/0201884 A1* | 8/2013 | Freda | ................ | H04W 74/0833 |
| | | | | 370/278 |
| 2014/0226552 A1* | 8/2014 | Niu | ........................ | H04L 5/0055 |
| | | | | 370/312 |
| 2015/0117323 A1* | 4/2015 | Hiben | ..................... | H04W 4/06 |
| | | | | 370/329 |
| 2015/0180676 A1* | 6/2015 | Bao | ................... | H04W 28/0236 |
| | | | | 370/230 |
| 2015/0208438 A1* | 7/2015 | Zhou | .................... | H04L 12/189 |
| | | | | 370/312 |
| 2016/0315876 A1* | 10/2016 | Sinha | ....................... | H04W 4/80 |
| 2017/0006494 A1* | 1/2017 | Wang | .................... | H04W 48/10 |
| 2017/0034670 A1* | 2/2017 | Zhang | .................... | H04W 4/06 |
| 2017/0034805 A1* | 2/2017 | Zhang | .................. | H04W 16/14 |
| 2017/0135068 A1* | 5/2017 | Kodaypak | ............ | H04L 65/103 |
| 2017/0324497 A1* | 11/2017 | Ruffini | .................... | H04L 45/02 |
| 2018/0199215 A1* | 7/2018 | Patil | ...................... | H04L 1/0003 |
| 2018/0224846 A1* | 8/2018 | Kovacs | ............... | G08G 1/0141 |

OTHER PUBLICATIONS

Written Opinion dated Feb. 12, 2018, issued in PCT Application No. PCT/EP2017/083500, filed Dec. 19, 2017.

* cited by examiner

TRANSMITTER NETWORK PROVIDED WITH AT LEAST TWO TRANSMITTERS, TRANSMITTER IN THE TRANSMITTER NETWORK AND RECEIVER IN THIS TRANSMITTER NETWORK

DESCRIPTION OF THE PRIOR ART

The invention relates to a transmitter network provided with at least two transmitters, according to the preamble of claim 1. The invention also relates to a transmitter and a receiver that can be used in this transmitter network.

Such a transmitter network is known from the name WiFi network or else WLAN network, according to which it is manufactured by manufacturers such as Fortinet and Meru.

In the known network, all the transmitters (also called Access Points AP) are operated in the same radio channel (on the same frequency). Since all the APs and all the receivers (also called clients) now operate on the same frequency even in adjacent cells, however, a central intelligence (called a controller or control device) is used that controls the "scheduling" of the individual radio transmissions such that no interfering, simultaneous, spatially adjacent radio transmissions arise. When moving through the radio field, it is then no longer the client but rather the infrastructure (controller) that decides which AP a client currently uses to handle his radio traffic, and an intelligent forwarding via the Access Points (handover) means that no kind of buffering processes and hence possible data losses arise.

Since control of the known network is performed centrally and the controller(s) always has/have detailed up-to-date knowledge, as far as the connection quality and transmission parameters of the individual "client AP connections" are concerned, the controller can take optimizing action here. It determines which transmissions from client to Access Point (AP) or from AP to client can take place, or even must NOT take place, at the same time, since it can compute the reciprocal disturbance influence by interference in advance. The one or other transmission from client to Access Point or from Access Point to client is then delayed minimally in time. The effect achieved by the avoidance of such collisions, especially in the area of a large number of clients, is a constantly high throughput in the radio channel. All the AP client connections are operated in unicast mode.

BRIEF DESCRIPTION OF THE INVENTION

The invention intends to further improve the known transmitter network. The transmitter network according to the preamble of Claim 1 is characterized according to the invention by the features specified in Claim 1. The transmitter according to the invention is characterized by the features recited in the claims. The receiver according to the invention is characterized by the features recited in the claims.

Advantageous embodiments of the transmitter network according to the invention are characterized by the claims. Advantageous embodiments of the transmitter according to the invention are characterized by the claims. Advantageous embodiments of the receiver according to the invention are characterized by the claims.

The invention concept now relates to a single-channel transmitter network (also called a single-frequency transmitter network—SFN), and particularly thereto in order to realize a broadcast or multicast transmission in such a network. At this juncture, it should be mentioned that multicast is a special case of broadcast, namely whereas broadcast is always directed at all receivers, multicast involves a particular subgroup of all the receivers being addressed. Since all the APs send in the same channel, that is to say on the same frequency, it is now possible for the same data content to be transmitted via all the APs, viewed over time, at stipulated instants for a certain, likewise stipulated period of time. This broadcast/multicast transmission (B/M mode) is effected on the physical layer of the network transmission system, e.g., WiFi system, as in the case of a Single-Frequency Network (SFN). All common-channel APs need to have accurately synchronized timing. This can be achieved by using a GPS timer, which accomplishes this, e.g., by regularly transmitting PTP (Precision Time Protocol) protocols to the APs.

Two modes of operation are now conceivable:

The precise instant at which the cyclic B/M mode is started and likewise the period for which this is meant to last is firmly set once by means of a management on the controller and on the APs. The operation of the single-channel transmitter (WiFi) network (with appropriate changes between unicast and B/M modes) then proceeds automatically and without further configurations.

It is also conceivable for the starting instant and the duration of the B/M modes to be set or customised dynamically. This can be effected either using an expanded beacon frame or using a management frame to be newly defined that is sent to all the APs by the controller and accordingly evaluated.

In the physical layer (PHY) data are transported as follows: the useful data bits are modulated onto individual carriers (PSK, QAM) according to the rules of present modulation and coding schemes (MCS). A particular number of such carriers in combination then results in an OFDM symbol. The OFDM symbols are transmitted at successive times. The OFDM symbols always have a particular pause, the Guard Interval (GI) or Cyclic Prefix (CP), placed between them. The OFDM symbols are transmitted individually always for a particular period, the OFDM symbol duration, via the antenna (for example in the case of WiFi according to IEEE 802.11n: OFDM symbol duration=3200 ns, GI_short=400 ns, GI_long=800 ns).

In unicast mode (UC), the individual OFDM symbols of every single Access Point are filled with individual UC data that are part of the single present UC connections between the APs and the connected clients. There are always individual transmission links between AP and client. During the BC/MC mode, the OFDM symbols are always transmitted at the same instants with identically modulated-on information on its carriers. The data from the MC/BC queue are modulated onto the OFDM symbols of all the APs. Each AP thus transmits an appropriate multiplicity of OFDM symbols for as long as the present BC periods last, said OFDM symbols being constructively overlaid at the receivers as radio-frequency signals, since every single receiver "sees" OFDM symbols as though they had been transmitted by only one transmitter.

Even with a short GI of $4 \times 10^{-7}$ sec and a propagation speed of the transmission (WiFi) signal of $3 \times 10^8$ msec, a transmission signal (WiFi signal) propagates around 120 m within the period of a GI. Only at distances of more than 120 m would intersymbol interference (self-interference) arise. This is completely negligible, however, on account of the high attenuation of the transmission (WiFi) radiofrequencies. The pure free-space attenuation at 100 m distance and 2.4 GHz is 80 dB, even 87 dB at 5 GHz, and indoor installations attenuate much more yet on account of materials (walls, furniture, etc.). Constructive overlaying of the OFDM symbols in BC/MC mode in the case of single-channel transmission/WiFi thus works even for the case of any-sized extent of the area covered by the transmission (WiFi) (coverage).

The Precision Time Protocol (PTP) is a network protocol that causes the synchronism of the time settings of multiple devices in a computer network. Unlike in the case of the Network Time Protocol (NTP), the focus of PTP is on greater accuracy and locally bounded networks. PTP can attain an accuracy in the region of nanoseconds in a hardware embodiment and in the region of a few microseconds in a software embodiment. PTP is defined in IEEE 1588 and has been implemented in IEC 61588.

BRIEF DESCRIPTION OF THE FIGURES

The invention is depicted in more detail on the basis of a few exemplary embodiments in the figures below, in which.

DETAILED DESCRIPTION OF THE FIGURES

The Transmitter Network

Figure 1:
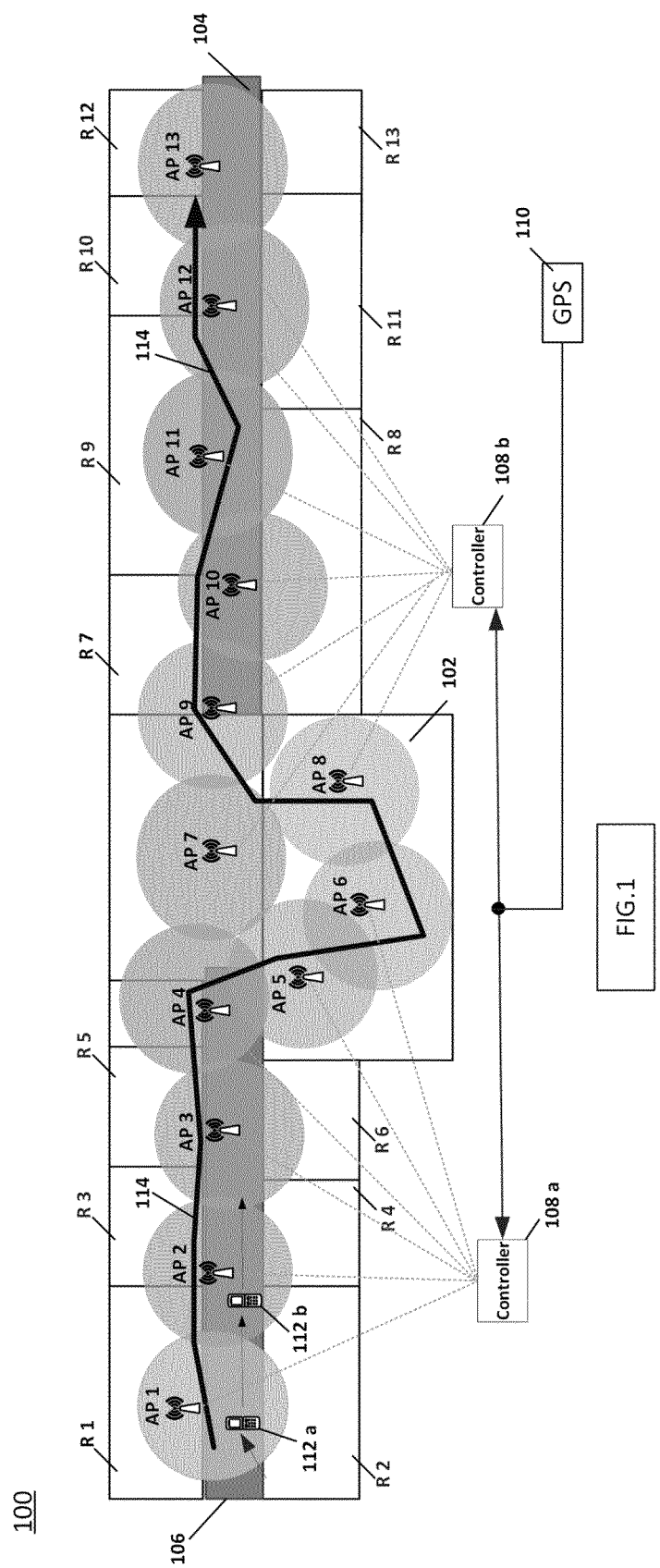
FIG. 1 shows an exemplary embodiment of a transmitter network according to the invention, with a receiver.

FIG. 1 shows a transmitter network 100 in a building. The building has a lecture theatre 102 in the middle and, on both sides of the lecture theatre, rooms R1 to R12 that can be reached via a corridor 104 or 106. Everywhere in the building are arranged transmitters (Access Points) AP1, AP2, AP3, . . . that transmit in the same frequency range. The circular rings around each transmitter APi indicate the transmission ranges of each transmitter. The transmitters AP1, AP2, AP3 and AP9 to AP13 are arranged in the two corridors 104, 106 so that the rooms can be fed by a transmission signal. The lecture theatre 102 has the transmitters AP4 to AP8 arranged in it so that the audience in the lecture theatre 102 can be supplied with a transmission signal. The transmitter network 100 additionally comprises a control device 108 that, in this exemplary embodiment, is realized by two controller units 108a and 108b. The control device controls the transmitters AP1 to AP13, as explained in even more detail later on the basis of FIG. 2. The control unit 108 is connected to a GPS system 110. The GPS system can be used to produce PTP protocols that achieve highly precise timing synchronization of the entire WiFi network. The GPS system is not absolutely necessary in this case because precise timing synchronization of the transmitter network can also be achieved by means of an atomic clock, if need be additionally by means of PTP.

To explain the invention further, it is assumed that there is a receiver 112 that moves through the building from left to right. The movement of the receiver 112 through the building is indicated by the line 114. The receiver 112 is first in the position 112a, on the corridor 106 between rooms R1 and R2, and is therefore in the transmission range of the transmitter AP1. Thereafter, the receiver moves right until it reaches the position 112b, and is therefore in the transmission range of the transmitter AP2, etc.

It should already be mentioned in advance at this juncture that there are three situations for the data transmission between the receiver 112 and the transmitters APi. First, there is the possibility of the user of the receiver 112 being interested only in a broadcast or multicast information transmission from the transmitters. Second, there is the possibility of the user of the receiver being interested only in a unicast information transmission from the transmitters. Third, there is the possibility of the user of the receiver being interested in both a unicast information transmission and a broadcast or multicast information transmission (e.g., if the user wants both to listen to a broadcast or multicast transmission and, e.g., to download a file from the Internet during the unicast transmission mode). This last possibility will be discussed further first.

Figure 2:
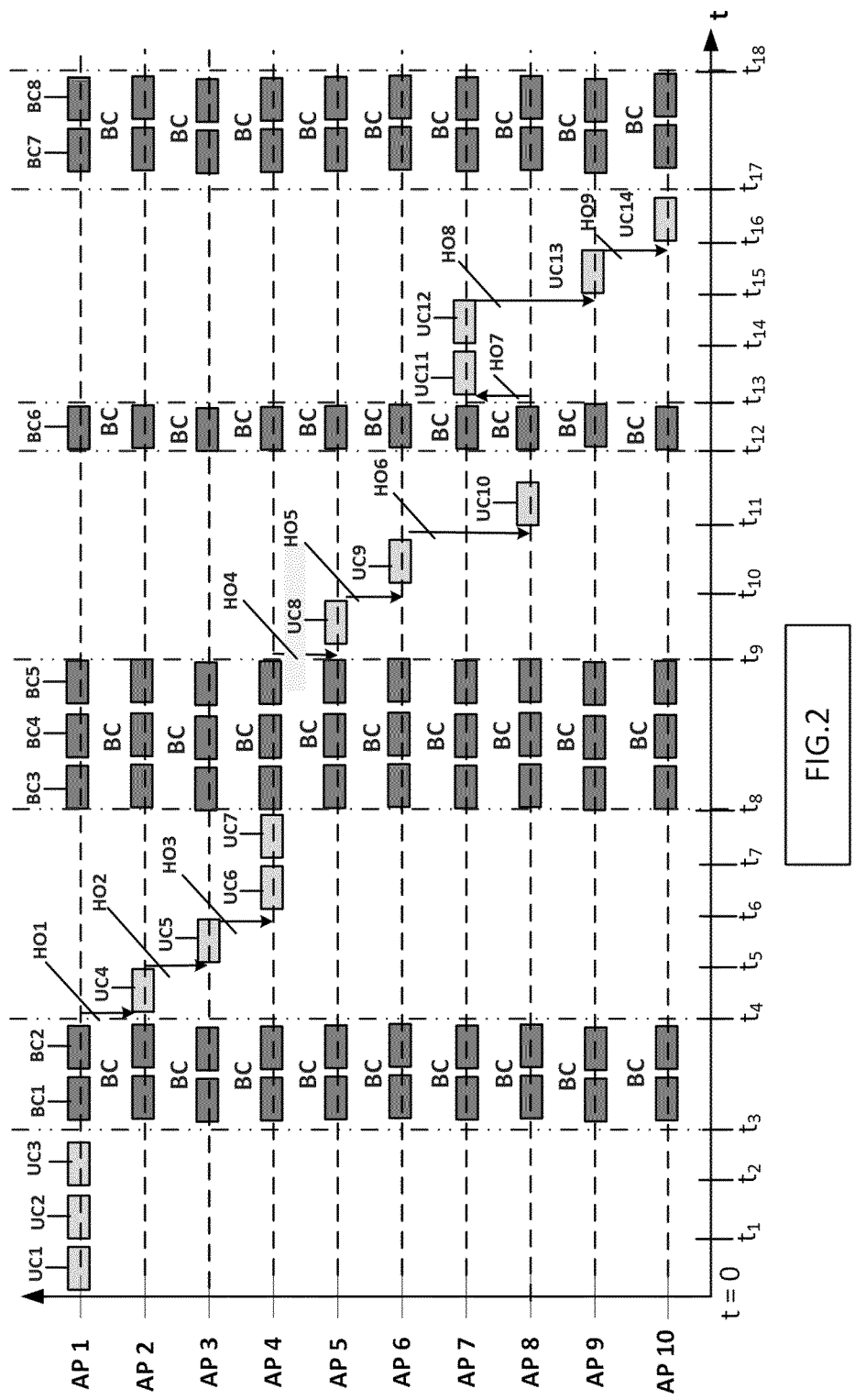
FIG. 2 shows a first exemplary embodiment of a few transmission signals as can occur in the transmitter network of FIG. 1.

The control device 108 (controller 108a) knows present connection and transmission parameters of every single connection between all the transmitters (Access Points) APi and accordingly connected receivers (clients) exactly. The most important variable in this case is the present signal-to-interference-and-noise ratio (SINR) of each connection. In this case, the SINR is constantly measured between all the receivers (clients) and transmitters APi that are in a certain proximity to one another that would allow a transmission in the first place. As such, the control device 108 knows the SINR between AP1 and 112a, via which connection data are currently transmitted, but it also knows the SINR between AP2 and 112*a*, and also between AP3 and 112*a*. As such, the control device 108 also knows the SINR between AP1 and 112*b*, the SINR between AP2 and 112*b* and the SINR between AP3 and 112*b*. The control device 108 controls the transmitter AP1 such that a unicast connection is set up between transmitter AP1 and receiver 112. This is indicated in FIG. 2 by virtue of unicast information packets UC1 to UC3 being transmitted from the transmitter AP1 to the receiver 112 in the time interval from t=0 (in this exemplary embodiment: to t=t3). At the instant t=t4, the receiver is in the position 112*b*, and hence in the region of overlap of the transmission ranges of the transmitters AP1 and AP2. The control device 108 (108*a*) now controls the transmitters AP1 and AP2 such that a handover HO1 takes place (triggered by the fact that the SINR value of the connecting link AP2-112*b* is now greater than the SINR value of the connecting link AP1-112), so that the connection between receiver 112 and transmitter AP1 is terminated at the end of an information packet transmission (MAC packet), a new connection is made between receiver 112 and transmitter AP2 and the next unicast information packet UC4 for receiver 112 is now already transmitted from the transmitter AP2 to the receiver 112.

Thereafter, the receiver moves further right in FIG. 1 until the receiver is in the region of overlap of the transmission ranges of the transmitters AP2 and AP3 at the instant t5 (see FIG. 2). The control device 108 (108*a*) now controls the transmitters AP2 and AP3 such that a handover HO2 takes place, so that the connection between receiver 112 and transmitter AP2 is terminated, and a connection is made between receiver 112 and transmitter AP3. The next unicast information packet UC5 for receiver 112 is now transmitted from the transmitter AP3 to the receiver 112.

Thereafter, the receiver moves still further right in FIG. 1 until the receiver is in the region of overlap of the transmission ranges of the transmitters AP3 and AP4 at the instant t6. The control device 108 (108*a*) now controls the transmitters AP3 and AP4 such that a handover HO3 takes place, so that the connection between receiver 112 and transmitter AP3 is terminated, and a connection is made between receiver 112 and transmitter AP4. The next unicast information packets UC6 and UC7 for receiver 112 are now transmitted from the transmitter AP4 to the receiver 112.

The receiver 112 moves further in the lecture theatre 106 until the receiver is in the region of overlap of the transmission ranges of the transmitters AP4 and AP5 at the instant t9. The control device 108 (108*a*) now controls the transmitters AP4 and AP5 such that a handover HO4 takes place, so that the connection between receiver 112 and transmitter AP4 is terminated, and a connection is made between receiver 112 and transmitter AP5. The next unicast information packet UC8 for receiver 112 is now transmitted from the transmitter AP5 to the receiver 112.

The receiver 112 moves further until the receiver is in the region of overlap of the transmission ranges of the transmitters AP5 and AP6 at the instant t10. The control device 108 (108*a*) now controls the transmitters AP5 and AP6 such that a handover HO5 takes place, so that the connection between receiver 112 and transmitter AP5 is terminated, and a connection is made between receiver 112 and transmitter AP6. The next unicast information packet UC9 for receiver 112 is now transmitted from the transmitter AP6 to the receiver 112.

The receiver 112 moves further until the receiver is in the region of overlap of the transmission ranges of the transmitters AP6 and AP8 at the instant tn. The control device 108 (108*a* and 108*b*) now controls the transmitters AP6 and AP8 such that a handover HO6 takes place, so that the connection between receiver 112 and transmitter AP6 is terminated, and a connection is made between receiver 112 and transmitter AP8. The next unicast information packet UC10 for receiver 112 is now transmitted from the transmitter AP8 to the receiver 112.

The receiver 112 moves further in the lecture theatre 102 until the receiver is in the region of overlap of the transmission ranges of the transmitters AP8 and AP7 at the instant t13. The control device 108 (108*b*) now controls the transmitters AP8 and AP7 such that a handover HO7 takes place, so that the connection between receiver 112 and transmitter AP8 is terminated, and a connection is made between receiver 112 and transmitter AP7. The next unicast information packets UC11 and UC12 for receiver 112 are now transmitted from the transmitter AP7 to the receiver 112.

The receiver 112 moves further until the receiver is in the region of overlap of the transmission ranges of the transmitters AP7 and AP9 at the instant t15. The control device 108 (108*b*) now controls the transmitters AP7 and AP9 such that a handover HO8 takes place, so that the connection between receiver 112 and transmitter AP7 is terminated, and a connection is made between receiver 112 and transmitter AP9. The next unicast information packet UC13 for receiver 112 is now transmitted from the transmitter AP9 to the receiver 112.

The receiver 112 moves further until the receiver is in the region of overlap of the transmission ranges of the transmitters AP9 and AP10 at the instant t16. The control device 108 (108*b*) now controls the transmitters AP9 and AP10 such that a handover HO9 takes place, so that the connection between receiver 112 and transmitter AP9 is terminated, and a connection is made between receiver 112 and transmitter AP10. The next unicast information packet UC14 for receiver 112 is now transmitted from the transmitter AP10 to the receiver 112.

In the (first) time intervals 0-t1; t1-t2; t2-t3; t4-t5; t5-t6; . . . the transmitters AP1, AP2, . . . , under the influence of the control device 108, therefore operate in a unicast transmission mode, in which unicast information packets with first information data are transmitted to the receiver 112.

According to the invention, the control device 108 controls the transmitters AP1, AP2, . . . in (second) time intervals t3-t4; t8-t9; t12-t13; t17-t18; . . . , however, such that they operate in a broadcast or multicast mode. In these second time intervals, all the transmitters transmit broadcast or multicast information from second information data. In this case, this broadcast or multicast information is sent by the transmitters NOT, as in the case of previous broadcast or multicast solutions, as MAC packets (a certain number of bytes from which a serial packet is formed) on the MAC level in layer 2, but rather within the physical layer (layer 1) in the form of temporally successive OFDM symbols, each with identically modulated-on bit information. The OFDM symbols that comprise the broadcast or multicast information are transmitted principally identically by all the APs during the broadcast/multicast time intervals (both the modulated-on useful information and the modulation and coding scheme (MCS) used as standard are the same). It can thus be seen in FIG. 2 that all the transmitters transmit two broadcast or multicast information packets BC1 and BC2 in the second time interval t3-t4, all the transmitters transmit three broadcast or multicast information packets BC3, BC4 and BC5 in the second time interval t8-t9, all the transmitters transmit a broadcast or multicast information packet BC6 in the second time interval t12-t13, and all the transmitters transmit two broadcast or multicast information packets BC7 and BC8 in the second time interval t17-t18. The simultaneous transmission of the OFDM symbols on the physical layer in BC/MC mode in the case of single-channel WiFi advantageously results in constructive overlay of these OFDM signals on all the receivers (during this broadcast/multicast time range). No kind of disturbances arise as a result of this type of transmission, which is performed by all the transmitters at the same time within the entire reception range in which all the receivers move.

Since, as has already been mentioned above, the user of the receiver 112 is interested both in the unicast transmission and in the broadcast or multicast transmission, the receiver therefore switches from a unicast reception mode to a broadcast or multicast reception mode at the physical layer at the instants t3, t8, t12 and t17, and from a broadcast or multicast reception mode to a unicast reception mode again at the instants t4, t9, t13 and t18.

If the user of the receiver 112 was interested only in the unicast information transmission, the receiver switches, for the time intervals t3-t4, t8-t9, t12-t13, and t17-t18, to a mode in which the broadcast or multicast information is not received, or is not processed in the receiver.

If the user of the receiver 112 was interested only in the broadcast or multicast information transmission, the receiver switches, for the time intervals t043, t4-t8, t9-t12, and t13-t17, to a mode in which the unicast information is not received, or is not processed in the receiver.

During the time intervals in which unicast information is transmitted, the OFDM symbols of the individual APs are not identical, they comprise different useful information and are (depending on the connection quality between AP and clients) also modulated using different MCS (Modulation and Coding Schemes).

In the exemplary embodiment of FIG. 2, the control by the control device 108 is such that the second time intervals are not the same length as one another. Likewise, the second time intervals are also not regularly successive to one another. However, it would be possible to realize the control by the control device 108 such that the second time intervals are always the same length and if need be also regularly successive to one another. This control by means of the control device 108 means that the transmitters are therefore in sync with one another. Preferably, they are in sync with one another according to the PTP (Precision Time Protocol), so that the transmitters can form a Single-Frequency Network (SFN) for the broadcast or multicast transmission with one another. The synchronization of the transmitters according to PTP allows this extremely accurate simultaneous switching of all the APs from unicast to broadcast/multicast and vice versa.

Figure 2A:
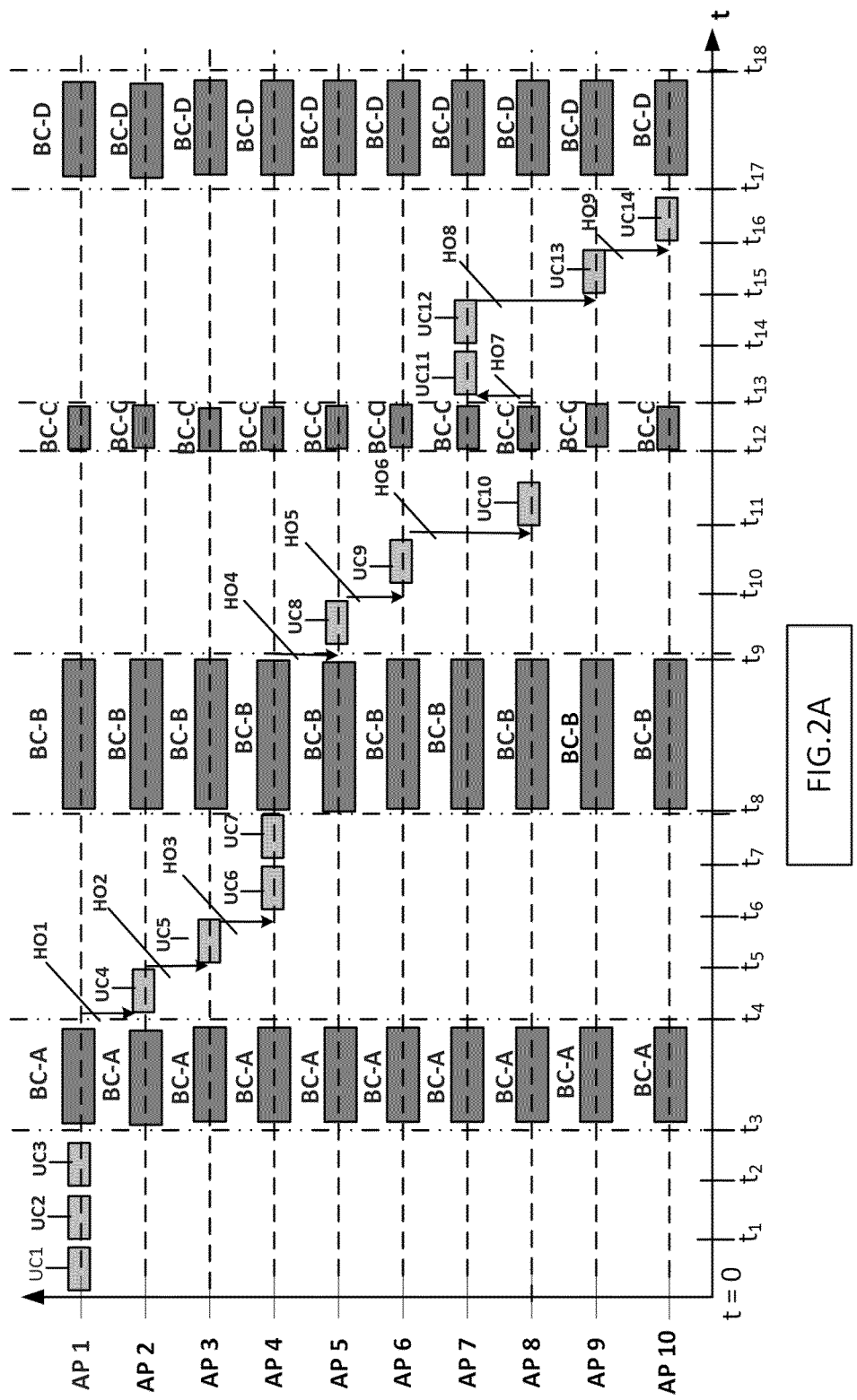
FIG. 2A shows a second exemplary embodiment of a few transmission signals as can occur in the transmitter network of FIG. 1.

FIG. 2A shows a second exemplary embodiment of the transmission signals, as can arise in the transmitter network of FIG. 1. The unicast transmission in this exemplary embodiment is exactly the same as in the exemplary embodiment of FIG. 2. The broadcast multicast transmission in the second time intervals t3-t4, t8-t9, t12-t13, and t17-t18 is now different. In particular, only a single data block BC-A is transmitted by all the transmitters in the second time interval t3-t4, only a single data block BC-B is transmitted in the second time interval t8-t9, and only a single data block BC-D is transmitted in the second time interval t17-t18, all in exactly the same manner as the single data block BC-C in the second time interval t12-t13. These two exemplary embodiments, as shown in FIG. 2 and in FIG. 2A, for the transmission signals between transmitter APi and receivers 112 and 116 result in different measures in the transmitters and receivers so that transmission (or generation) of these transmission signals according to one of these exemplary embodiments of the transmission signals can be rendered possible, as will be explained in even more detail later during the description of the transmitters and receivers.

The control of the transmitters AP1 to AP13 by means of the control device 108 will now be explained on the basis of FIGS. 3 and 4, in the case in which there are two receivers 112 and 116, see FIG. 3. In this case, the receiver 112 moves, as already described above on the basis of FIG. 2, along the line 314, from left to right through the building until it reaches the lecture theatre 102. The receiver 116 is in the transmission range of the transmitter AP13, and moves from right to left through the building, along the line 316, until it also arrives in the lecture theatre 102.

In this case, it is also first assumed that the users of the receivers 112 and 116 are interested in both a unicast information transmission and a broadcast or multicast information transmission (e.g., if the user wants both to listen to a broadcast or multicast transmission and, e.g., to download a file from the Internet during the unicast transmission mode). The receiver 112 receives a transmission signal A, in the form of unicast information packets of a program or of a file that is downloaded from the Internet, from the transmitter AP1. These packets are indicated by UC1(A), UC2(A), . . . etc. in FIG. 4. As also already described on the basis of FIG. 2, these unicast information packets UCi(A) are transmitted to the receiver 112 in the first time intervals 0-t1; t1-t2; t2-t3. The movement of the receiver 112 until it reaches the transmission range of the transmitter AP5 is described exactly as on the basis of FIG. 2. Therefore, handovers HO1, HO2, HO3 and HO4 will take place, and unicast information packets UC4(A) and UC5(A) and UC6(A) and UC7(A) are transmitted from the transmitters AP2 and AP3 and AP4 to the receiver 112 in the first time intervals t4-t5; t5-t6; t6-t7, and t7-t8. At the instant t9, the receiver 112 reaches the transmission range of the transmitter AP5 and a handover HO4 takes place.

Figure 3:
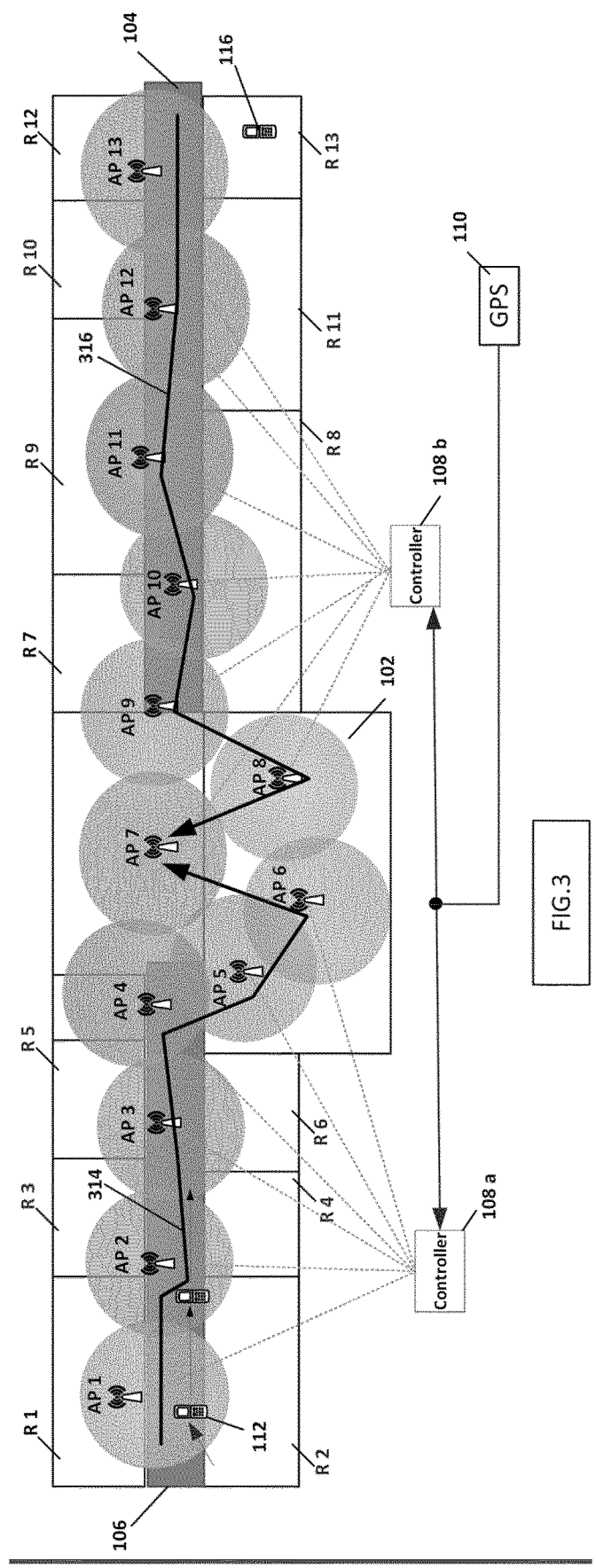
FIG. 3 shows the transmitter network in FIG. 1, with two receivers.
Figure 4:
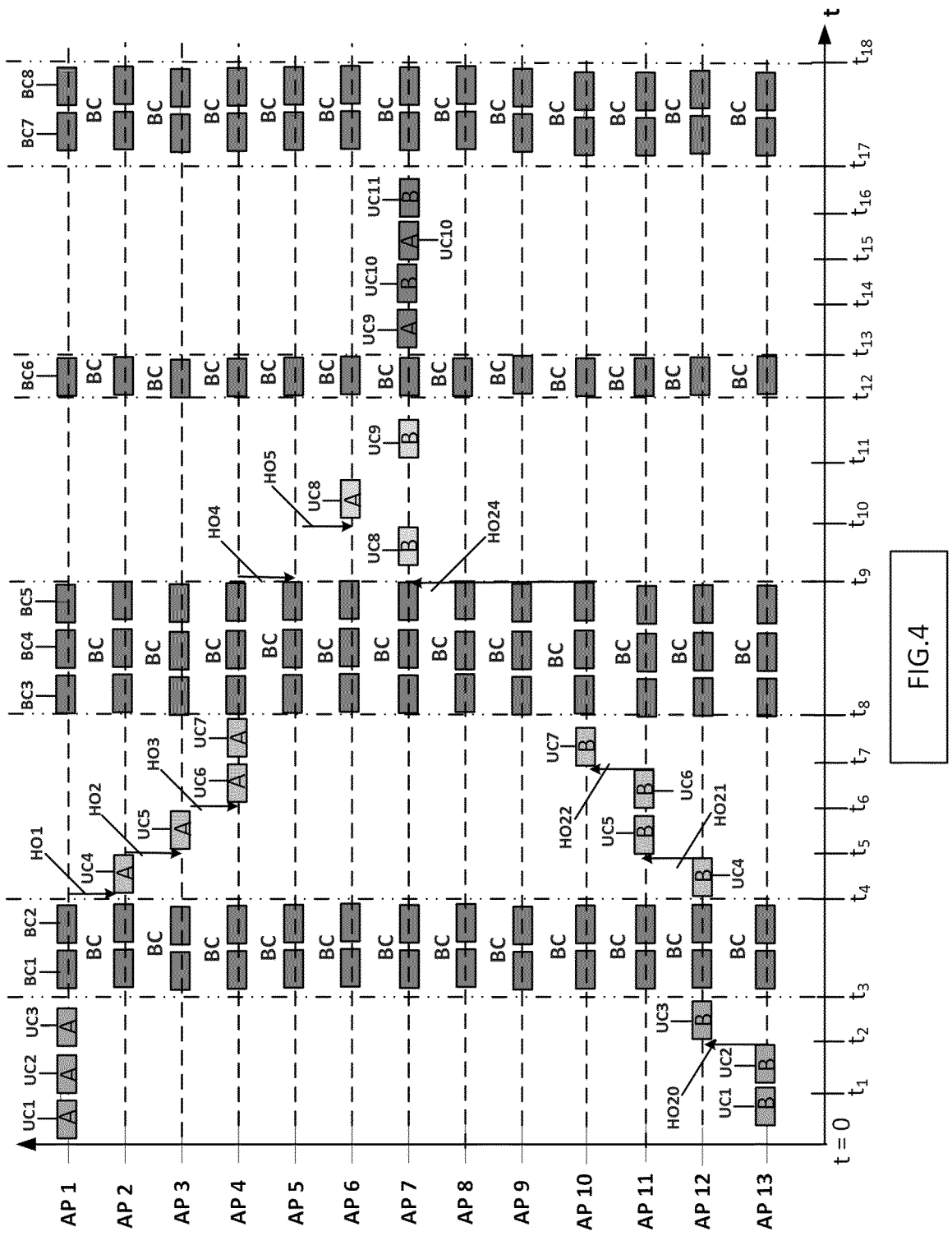
FIG. 4 shows a first exemplary embodiment of a few transmission signals as can occur in the transmitter network of FIG. 3.

From t=0, the receiver 116 moves left from the transmission range of the transmitter AP13 in FIG. 3. The receiver 116 receives a transmission signal B in the form of unicast packets of a program or of a file that is downloaded from the Internet. The transmission signal B is transmitted from the transmitter AP13 to the receiver 116 in the time intervals 0-t1 and t1-t2 in the form of unicast information packets UC1(B) and UC2(B). When the receiver 116 is in the region of overlap of the transmission ranges of the transmitters AP13 and AP12 (at the instant t2), a handover HO20 takes place. The transmitter AP12 now transmits unicast information packets UC3(B) and UC4(B) to the receiver 116 in the first time intervals t2-t3 and t4-t5. When the receiver 116 is in the region of overlap of the transmission ranges of the transmitters AP12 and AP11 (at the instant t5), a handover HO21 takes place. The transmitter AP11 now transmits unicast information packets UC5(B) and UC6(B) to the receiver 116 in the first time intervals t5-t6 and t6-t7. When the receiver 116 is in the region of overlap of the transmission ranges of the transmitters AP11 and AP10 (at the instant t7), a handover HO22 takes place. The transmitter AP10 now transmits a unicast information packet UC7(B) to the receiver 116 in the first time interval t7-t8.

At the instant t9, the receiver 112 is in the transmission range of the transmitter AP5. The receiver 116 is in the transmission range of the transmitter AP7. This means that a handover HO24 takes place so that the receiver 116 is connected to the transmitter AP7. The transmission ranges of the transmitters AP5 and AP7 are transmission ranges of adjacent transmitters, and the transmissions of the two transmitters could disturb one another if no precautionary measures are taken.

As a result of the transmitters transmitting in the same frequency range, adjacent transmitters cannot transmit unicast information packets from different programs to different receivers at the same time in unicast transmission mode. The control device 108 controls the two transmitters AP5 and AP7 such that the transmitter AP5 remains silent in the time interval t9-t10, and the transmission of the unicast information packet UC8(A) is delayed until the time interval t10-t11. The transmitter AP7 is controlled such that it transmits a unicast information packet UC8(B) to the receiver 116 in the time interval t9-t10.

At the instant t10, the receiver 112 is in the region of overlap of the transmission ranges of the transmitters AP5 and AP6, so that a handover HO5 takes place. The unicast information packet UC8(A) for the receiver is therefore transmitted from the transmitter AP6 to the receiver 112 in the time interval t10-t11. Since the transmitters AP6 and AP7 are likewise adjacent, the control device 108 controls the transmitter AP7 such that it is silent in the time interval t10-t11. In the time interval t11-t12, the transmitter AP7 transmits a unicast information packet UC9(B) to the receiver 116 and the transmitter AP6 is now silent.

At the instant t13, the receiver 112 has arrived at the region of overlap of the transmission ranges of the transmitters AP6 and AP7 and a handover HO6 takes place so that the receiver 112 likewise receives its information from the transmitter AP7 from t13. Thus, a unicast information packet UC9(A) is transmitted from the transmitter AP7 to the receiver 112 in the time interval t13-t14, a unicast information packet UC10(B) is transmitted from the transmitter AP7 to the receiver 116 in the time interval t14-t15, a unicast information packet UC10(A) is transmitted from the transmitter AP7 to the receiver 112 in the time interval t15-t16 and a unicast information packet UC11(B) is transmitted from the transmitter AP7 to the receiver 116 in the time interval t16-t17.

In the second time intervals t3-t4; t8-t9; t12-t13, and t17-t18, as already explained above on the basis of FIG. 2, all the transmitters transmit the same broadcast or multicast information packets BC, which can therefore be received by the receivers 112 and 116, regardless of where they are currently located in the area, so that uninterrupted reception of the broadcast or multicast information is ensured.

As described, all the receivers receive identical OFDM signals (transmitted by all the transmitters) during the second time intervals, and these OFDM signals are "constructively" overlaid at each receiver. During the broadcast/multicast intervals, there are no "return connections" from the receivers to the transmitters. Broadcast goes only in the downlink direction. Any handover then takes place again only after termination of the broadcast mode, that is to say in UC mode (as also described above for the handover HO24) and is then controlled by the control device 108, as described.

Since, as has already been mentioned above, the users of the receivers 112 and 116 are interested both in the unicast transmission and in the broadcast or multicast transmission, the receivers 112 and 116 therefore switch from a unicast reception mode to a broadcast or multicast reception mode at the instants t3, t8, t12, and t17, and from a broadcast or multicast reception mode to a unicast reception mode again at the instants t4, t9, t13, and t18.

If the users of the receivers 112 and/or 116 were interested only in the unicast information transmission, the receivers switch, for the time intervals t3-t4, t8-t9, t12-t13, and t17-t18, to a mode in which the broadcast or multicast information is not received, or is not processed in the receivers. If the users of the receivers 112 and/or 116 were interested only in the broadcast or multicast information transmission, the receivers switch, for the time intervals t0-t3, t4-t8, t9-t12, and t13-t17, to a mode in which the unicast information is not received, or is not processed in the receivers.

Figure 4A:
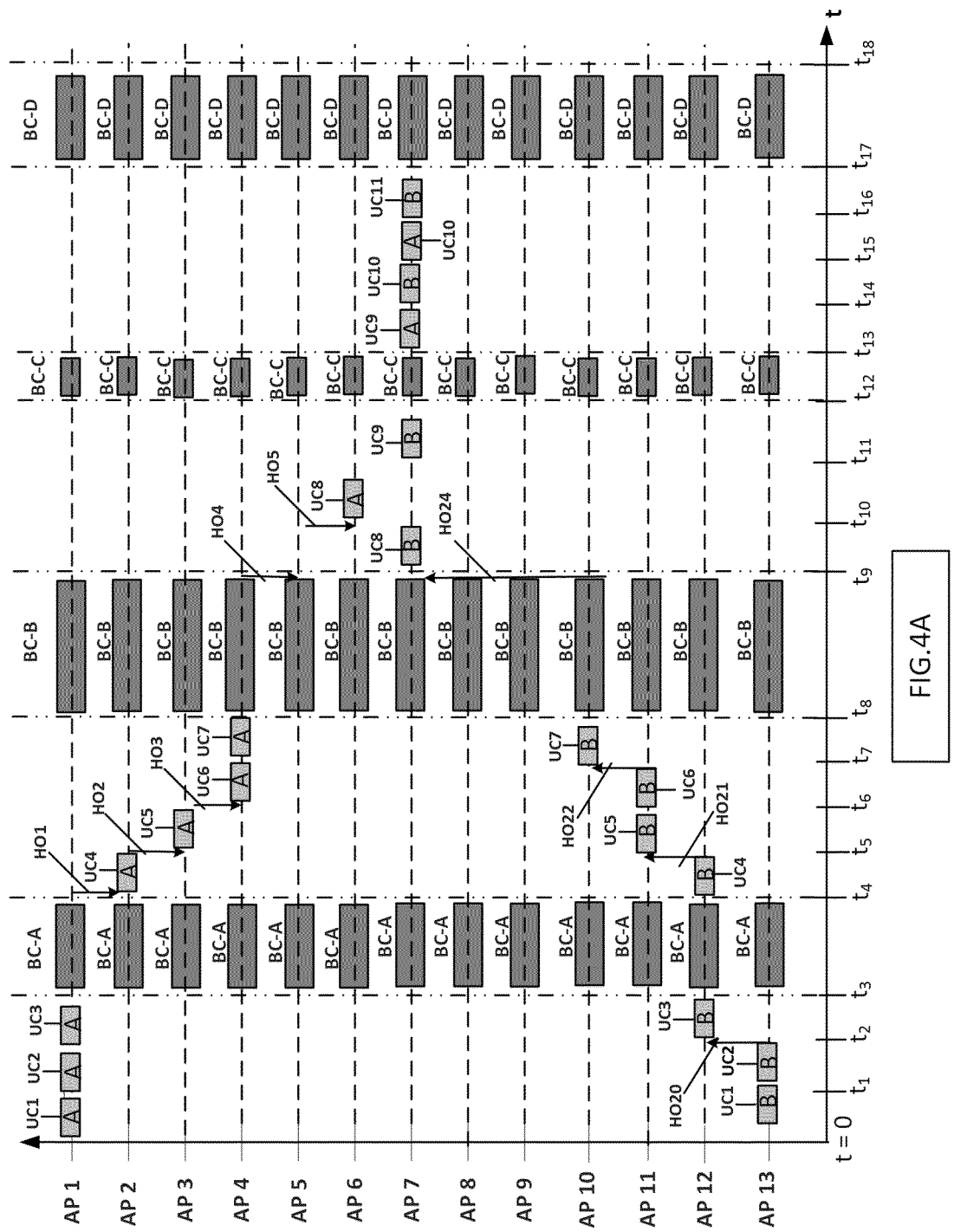
FIG. 4A shows a second exemplary embodiment of a few transmission signals as can occur in the transmitter network of FIG. 3.

FIG. 4A shows a second exemplary embodiment of the transmission signals, as can arise in the transmitter network of FIG. 3. The unicast transmission in this exemplary embodiment is exactly the same as in the exemplary embodiment of FIG. 4. The broadcast multicast transmission in the second time intervals t3-t4, t8-t9, t12-t13, and t17-t18 is now different. In particular, only a single data block BC-A is transmitted by all the transmitters in the second time interval t3-t4, only a single data block BC-B is transmitted in the second time interval t8-t9, and only a single data block BC-D is transmitted in the second time interval t17-t18, all exactly in the manner of the single data block BC-C in the second time interval t12-t13. These two exemplary embodiments for the transmission signals between transmitter APi and receivers 112 and 116 result in different measures in the transmitters and receivers so that transmission (or generation) of these transmission signals according to one of these exemplary embodiments of the transmission signals can be rendered possible, as will be explained in even more detail later during the description of the transmitters and receivers.

The WLAN Transmission Link

Figure 5:
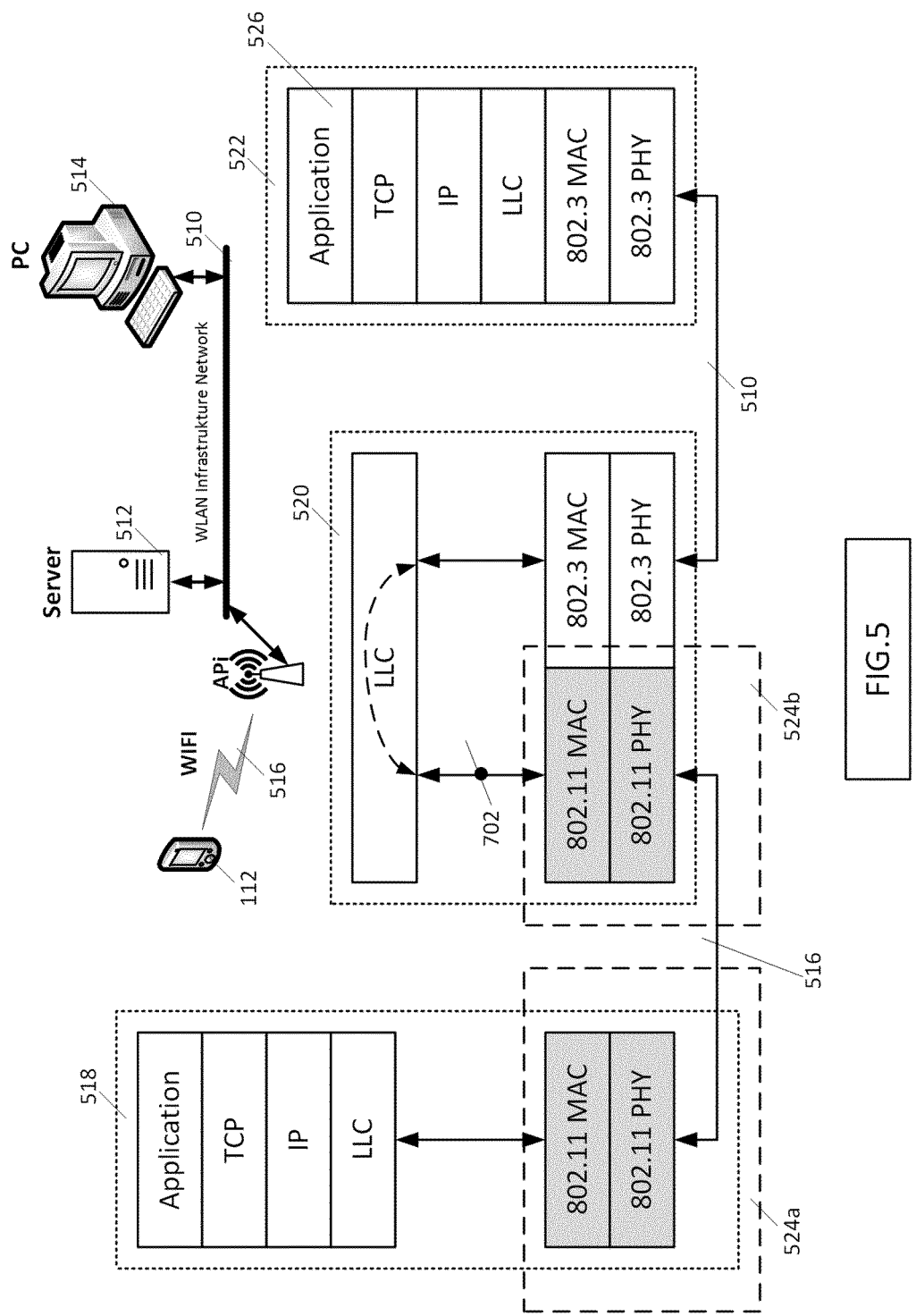
FIG. 5 shows the layer structure of a transmitter network according to the WLAN specification IEEE 802.11.

The inventive control of the transmitters APi and receivers (clients) 112j by the control device 108 (108a, 108b) requires changes/additions that need to be newly integrated into the WLAN standard specification IEEE 802.11, namely in order to allow the broadcast transmission mode in the WLAN:

First of all, to this end, FIG. 5 describes the transmitter network in the form of a layer structure according to the IEEE 802.11 standard specification. To this end, FIG. 5 shows the data transmission between a transmitter APi and a receiver 112. The transmitter APi, and generally all the transmitters APi, are connected to a PC 514 and a server 512 via a WLAN infrastructure network 510, such as, e.g., Ethernet. The control unit 108/108a, 108b may be comprised in the PC 514, or may also be connected to the infrastructure network 510 as a separate control circuit. However, it is now assumed that the control unit 108 is included in the PC 514. The transmitter APi and the receiver 112 have a wireless WLAN (WiFi) transmission link 516 provided between them. The layer stack 518 schematically shows the signal processing in the receiver 112. The layer stack 520 schematically shows the signal processing that takes place in the transmitter APi. The layer stack 522 schematically shows the signal processing as takes place in the server 512 and/or PC 514. It is important for the invention what takes place in the MAC and PHY layers of the wireless WiFi transmission 516, as are indicated in the blocks 524a and 524b indicated by a broken line, and as are defined in the WLAN standard specification IEEE 802.11.

Unicast data, as are known to be meant to be transmitted to the receiver 112, are generated in an application 526 in the server 512 or PC 514. This is realized because these unicast data are received wirelessly via an antenna arranged outside the building. This is not discussed further, because it is prior art, such as, e.g., as an LTE data transmission system.

Following signal processing in the layer stack 522, by means of TCP (Transmission Control Protocol) signal processing in the TCP/UDP layer of the stack 522 (or UDP (User Datagram Protocol) signal processing in the TCP/UDP layer of the stack 522, IP (Internet Protocol) signal processing in the IP layer, LLC (Logical Link Control) signal processing in the LLC layer, MAC (Media Access Control) signal processing in the 802.3 MAC layer, and PHY (Physical Layer) signal processing in the 802.3 PHY layer), the data are forwarded to the transmitter APi via the infrastructure network 510.

The unicast data are received in the transmitter APi and decoded in the 802.3 PHY layer of the layer stack 520, and thereafter decoded in the 802.3 MAC layer. Thereafter, the data obtained in this manner are coded again in the 802.11 MAC layer, coded again in the 802.11 PHY layer, and thereafter forwarded to the receiver 112 via the WiFi connection 516.

In the receiver 112, the received data are decoded in the 802.11 PHY layer of the layer stack 518, decoded in the 802.11 MAC layer, processed further in the LLC layer, and thereafter decapsulated further in the IP layer. Finally, following processing in the TCP/UDP layer, the data obtained in this manner are supplied to the application 530 that is active in the receiver 112 and are processed further therein.

Unicast data that need to be transmitted in the opposite direction via a return channel from the receiver 112, via the transmitter (Access Point) APi, to the server 512 or PC 514 are in turn processed in a known manner, in the opposite order to the signal processing steps described above. These are any data, not just control data, that simply flow in the opposite direction, that is to say, e.g., a file upload to the server 512, or a video that comes from a smartphone and is sent to the server or PC or to the Internet.

As already indicated above, the measures of the invention for realizing the broadcast or multicast transmission are principally directed at measures that are performed in the blocks 524a (that is to say in the receiver 112) and 524b (that is to say in the transmitter APi). In particular, they are the setup of the transmission signal on the transmission link 516, that is to say are the setup of the transmission signal in the physical layer PHY. According to the invention, a first codeword is included in the transmission signal 516 in the physical layer, which codeword characterizes the unicast transmission mode or the broadcast or multicast transmission mode. If need be, a second codeword could also be included in the transmission signal 516 in the physical layer, which second codeword is a measure of the length of the second time intervals. As discussed later, the first codeword can be stored in a bit combination that has not yet been used in the IEEE standard specification up to now. The EDCA parameter element in the beacon frame of the transmission signal 516 would be suitable therefor.

The WLAN transmission signal on the MAC layer (part of layer 2) comprises different kinds of frames, inter alia data frames, control frames, and management frames. Further, there are, according to the WLAN IEEE 802.11 specification, different kinds of management frames, one of which is the beacon management frame. These beacon management frames repeatedly occur in the transmission signal 516 (e.g., every 100 ms). Receivers, such as receiver 112, use the information in the beacon management frames to find and identify a network and to connect to the network (the transmitters APi). The transmitters APi are each responsible for the transmission of the beacon management frames.

The control frames (not shown further) comprise a sink address and a source address that ensure a connection is set up between a specific transmitter APi and a specific receiver 112, so that the unicast data can be transmitted to the correct receivers.

Figure 5A:
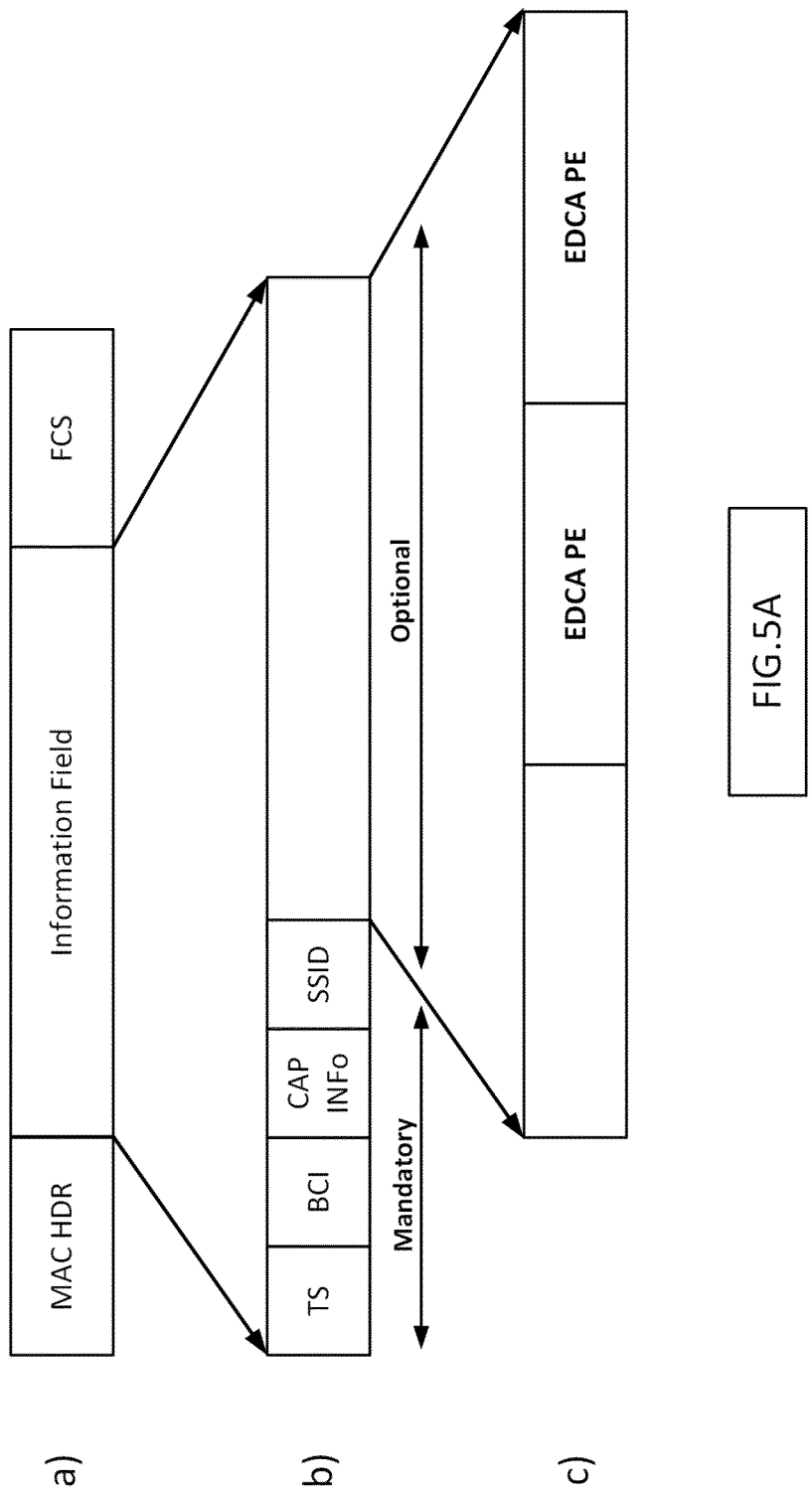
FIG. 5A shows the structure of a Beacon Management Frame according to the IEEE 802.11 specification.

FIG. 5A shows the structure of a beacon management frame according to the IEEE 802.11 specification within the MAC layer.

A beacon management frame comprises a first frame portion, indicated by MAC HDR (MAC header), a second frame portion, indicated by information field (frame body), and a third frame portion indicated by FCS (Frame Check Sum), see FIG. 5A(a).

The first frame portion MAC HDR comprises inter alia two frame control bytes, a sink address, and a source address (not shown). The two frame control bytes contain inter alia a frame indicator that indicates whether the frame is a management frame of beacon type. The second frame portion is constructed from an obligatory portion (mandatory) and possibly also from a nonobligatory portion (optional), see FIG. 5A(b). The obligatory portion comprises a time stamp (TS), a Beacon Interval (BI), Capacity Information (CAP INFO) and a Service Set Identifier (SSID).

When a nonobligatory portion (optional) is on hand, this nonobligatory portion comprises what is known as an EDCA (Enhanced Distributed Channel Access) Parameter Element EDCA PE, see FIG. 5A(c). In order to render the invention possible, the optional portion is necessary because the EDCA parameter elements are necessary in this case, as will be explained later.

Figure 5B:
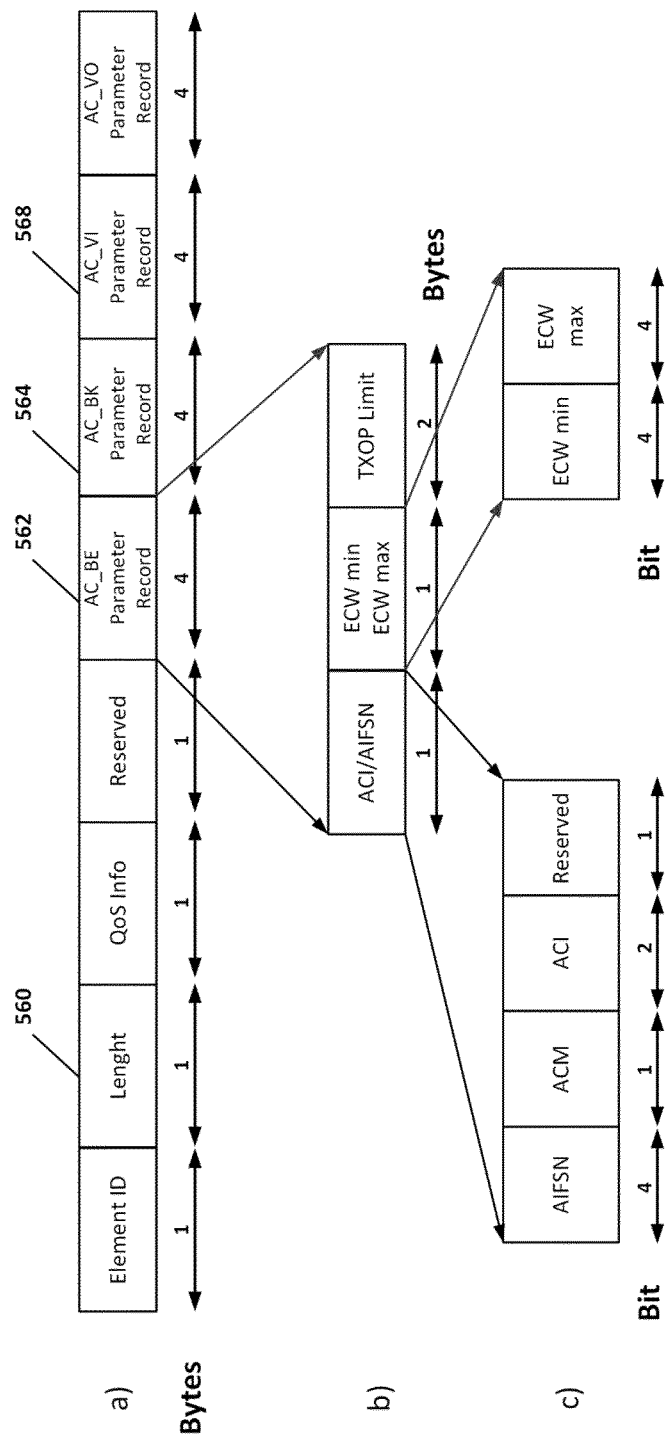
FIG. 5B shows the structure of an EDCA parameter element standardized in the IEEE 802.11 standard specification in a beacon frame.

FIG. 5B shows the structure of an EDCA parameter element standardized in the IEEE 802.11 standard specification within a beacon management frame, as it appears on the MAC level.

In the IEEE 802.11 standard, there is, from the technical standard 802.11n onward (since 2009), the EDCA (Enhanced Distributed Channel Access) functionality, which was expanded by a few additions in backward-compatible fashion in the 802.11ac standard (2013). The EDCA functionality contains multiple control mechanisms for WLAN clients (receivers) in order to guarantee orderly, chronologically arranged access to the transmission medium without WLAN clients (receivers) disturbing one another through interference. In the case of EDCA, four Access Categories (AC) are defined, "voice (VO)" with the highest priority, then "Video (VI)", then "Best Effort (BE)" and, with the lowest priority, "Background (BK)".

In the most important management frame for WLAN, the beacon, and in the probe response frames, "EDCA parameter elements" are transmitted. The two frames are directed from the transmitter APi to the clients (receivers) 112i. Beacons are repeatedly transmitted in accordance with an adjustable "beacon period" (default 100 ms, adjustable between 1 ms and 10 000 ms).

FIG. 5B shows, in FIG. 5B(a), the structure of the EDCA parameter elements, which has been standardized in IEEE 802.11 hitherto. An EDCA parameter element comprises a length indicator byte 560 that indicates how long the EDCA parameter element is. In this case, the EDCA parameter element is 20 bytes long, and comprises 8 partial elements. The last four partial elements 562, 564, 566 and 568 are four bytes long, and are the parameter records for the four Access Categories VO, VI, BE, and BK. FIG. 5B(b) shows the structure of a parameter record. The parameter record comprises three information blocks ACI/AIFSN (1 byte long), ECWmin/ECWmax (1 byte long), and TXOP limit (two bytes long). FIG. 5B(c) shows the structure of the information blocks ACI/AIFSN and ECWmin/ECWmax. The information block ACI/AIFSN comprises four partial blocks:

AIFSN (Arbitrary Interfame Space N, where N assumes the digits 1, 2, or 3-4 bits long), ACM (Admission Control Mandatory—1 bit long), ACI (Access Category Identify—2 bits long), and a partial block 502 (constructed from a bit combination, in this case: 1 bit long) that is unused (reserved). The information block ECWmin/ECWmax comprises two partial blocks (ECWmin and ECWmax), each block being 4 bits long.

The IEEE 802.11 standard specification describes the structure of the EDCA parameter element of FIG. 5B in more detail.

Figure 6:
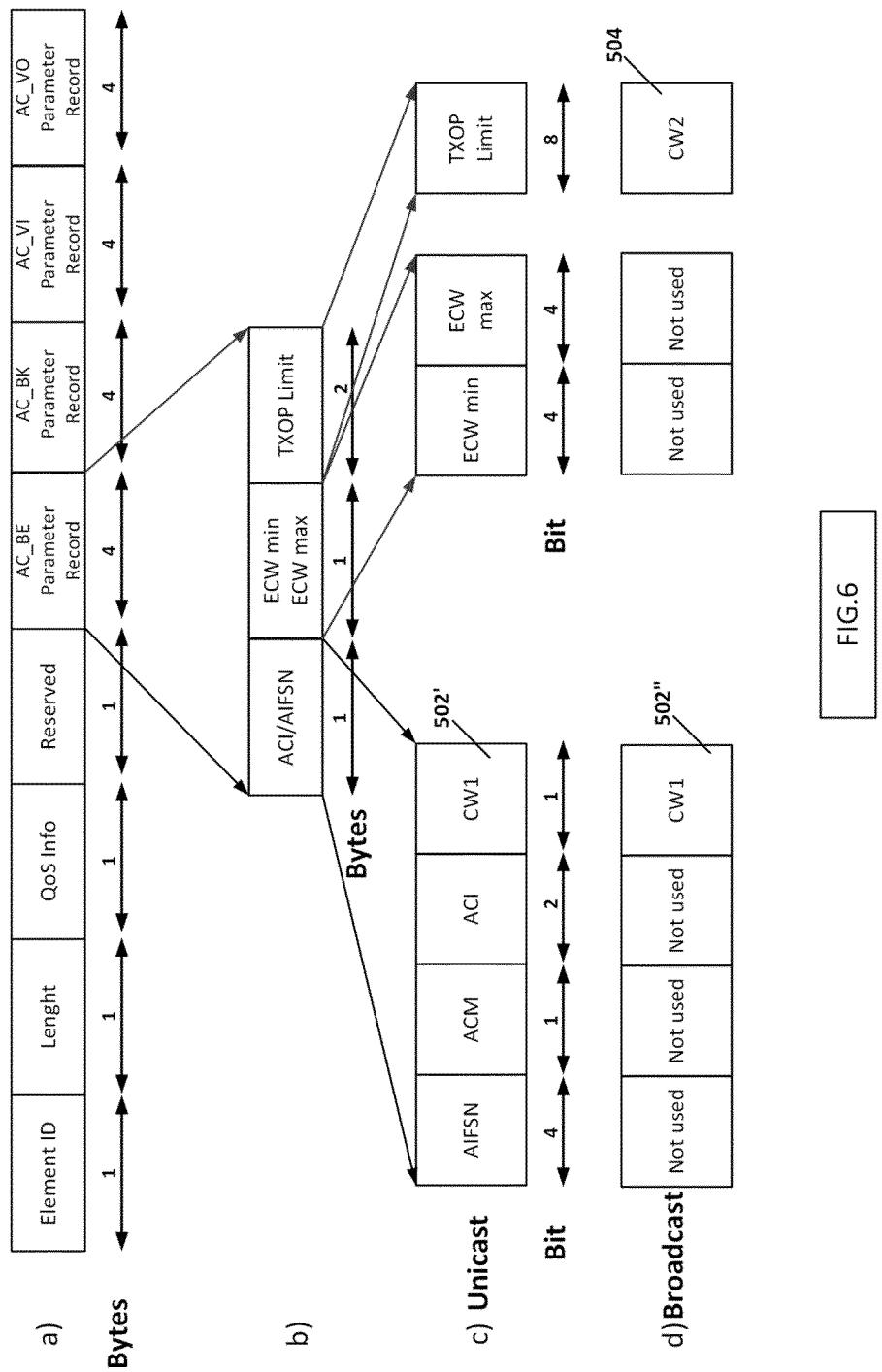
FIG. 6 shows a first exemplary embodiment of an EDCA parameter element modified according to the invention.

FIG. 6 shows a first exemplary embodiment of an EDCA parameter element structured according to the invention. FIGS. 6(*a*) and 6(*b*) are the same as FIGS. 5B(a) and 5B(b), respectively.

At this juncture, a hitherto unused bit combination, in this exemplary embodiment the hitherto unused codeword 502, in FIG. 5B(c) is now utilized according to the invention to identify the transmission mode (unicast or broadcast or multicast) of a transmitter. A first value for the codeword 502 could then characterize the unicast transmission mode, see FIG. 6(*c*). A second value of the codeword 502 could then characterize the broadcast or multicast transmission mode, see FIG. 6(*d*). In the special case of a 1-bit codeword 502, a zero ('0') could characterize the unicast transmission mode, see codeword 502' in FIG. 6(*c*). Moreover, a one ('1') could then characterize the broadcast or multicast transmission mode, see the codeword 502" in FIG. 6(*d*). For the broadcast or multicast transmission mode, FIG. 6(*d*), the AIFSN, ACM, ACI, ECWmin and ECWmax information blocks are not used because they all represent control and parameter information for the MAC layer in the unicast transmission mode. For this reason, they are indicated by 'not used' in FIG. 6(*d*).

As a preference, in broadcast or multicast transmission mode, see FIG. 6(*d*), the TXOP limit information block 504 is used to indicate the length of time of a second time interval in which a broadcast or multicast transmission takes place.

This transmission mode indication, and possibly also this length-of-time indication, could be included in just one of the four parameter records present. Other solutions would also be possible, however, e.g., the codewords 502 in all four parameter records comprising this indication or these indications. Particularly if both the transmission mode indicator 502/502'/502" and the time interval length indicator 504 are comprised in the EDCA parameter element, and hence are transmitted to the receiver 112, it would suffice to transmit an EDCA parameter element according to FIG. 6(*d*) once for the transition from a unicast transmission mode to the broadcast or multicast transmission mode only. A receiver can, as explained in more detail later, detect the '1' bit of the codeword 502" quickly in the physical layer, and can store the length of time of the second time interval of the broadcast or multicast transmission, as is present in the codeword 504, in a counter as a (e.g., final) count value. The detection of the '1' bit from the codeword 502" ensures that the receiver is switched from unicast reception mode to broadcast or multicast reception mode. The counter then begins to count up from zero until its count value is equal to the final count value. The receiver then knows that the broadcast or multicast transmission mode of the transmitter is at an end.

In the exemplary embodiment, wherein only the transmission mode indicator 502/502'/502" is comprised in the EDCA parameter element, and not the length of time (codeword 504 is then not used), the receiver knows from reception of the '1' bit that the transmitter switches from the unicast transmission mode to the broadcast or multicast transmission mode. Moreover, on reception of a '0' bit, the receiver knows that the transmitter switches from the broadcast or multicast transmission mode to the unicast transmission mode.

Figure 6A:
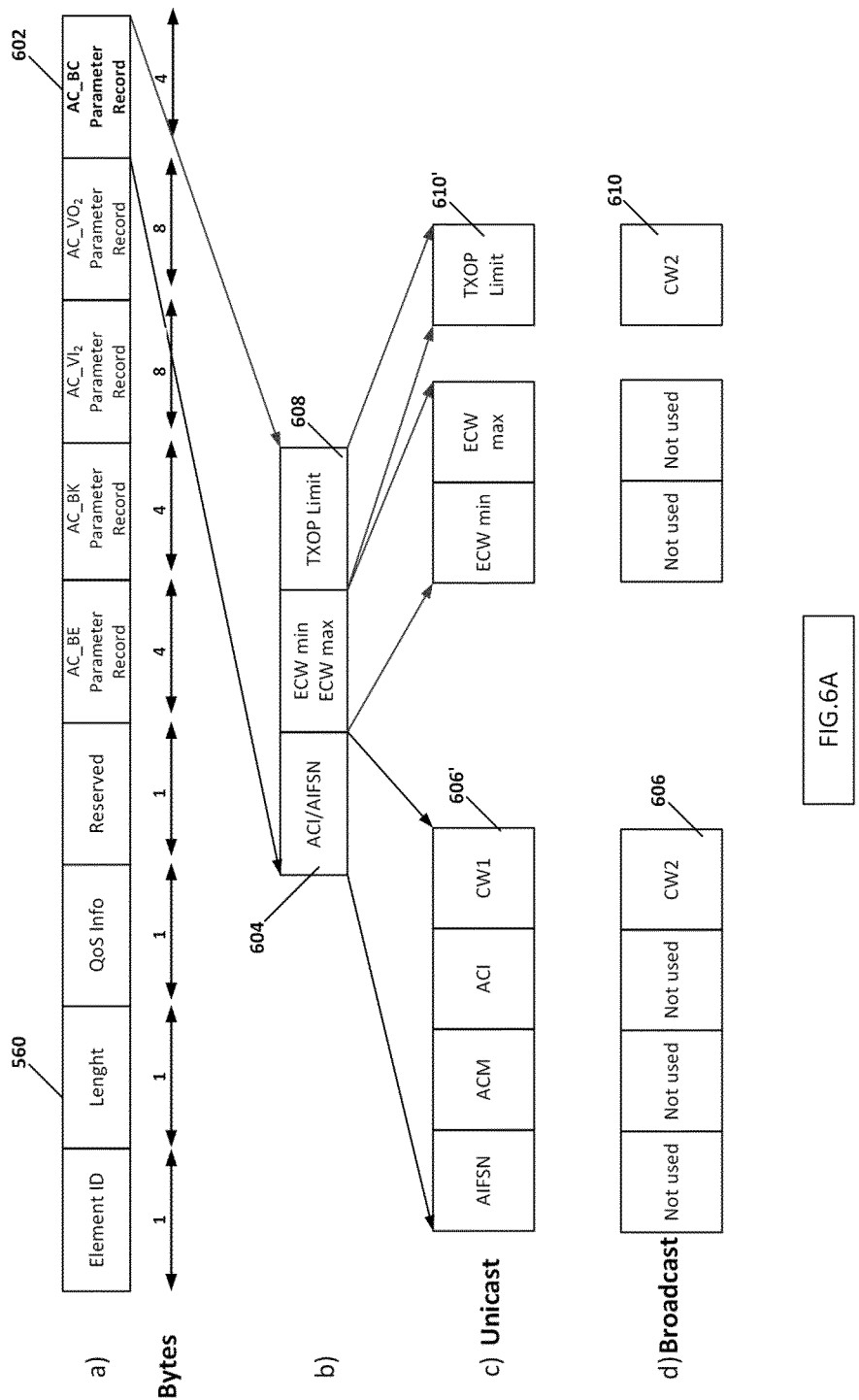
FIG. 6A shows a second exemplary embodiment of an EDCA parameter element modified according to the invention.

FIG. 6A shows a second exemplary embodiment of an EDCA parameter element structured according to the invention. The EDCA parameter element is shown in FIG. 6A(a) and differs from the EDCA parameter element in FIG. 5B(a) in that an additional 4-byte partial element, the AC_BC Parameter Record 602, is provided. This means that a new Access Category is defined for Broadcast Traffic (BC) data traffic that is meant to be broadcast by a transmitter APi.

FIG. 6A(b) shows the structure of the AC_BC Parameter Record 602. This structure is the same as the structure of the parameter record, as is shown in FIG. 5B(b). FIG. 6A(c) shows the structure of the AC_BC Parameter Record 602 in more detail, with a unicast transmission mode having been switched on. Moreover, FIG. 6B(d) shows the structure of the AC_BC Parameter Record 602 in more detail, with a broadcast or multicast transmission mode having been switched on.

According to the invention, there is now a proposal for the unused partial block 502 in FIG. 5c to be used such that:
Reserved=0 normal UC mode, see partial block 606' in FIG. 6A(c), and
Reserved=1 broadcast or multicast mode, see partial block 606 in FIG. 6A(d).

The partial blocks AIFSN, ACM and ACI in the broadcast or multicast mode are not used (Not Used!)

The information block ECWmin/ECWmax is then likewise not used in the broadcast mode (Not used)

If need be, the information block TXOP Limit 608 is used in this case too, because in the broadcast or multicast mode "TXOP BC Limit" 610 is in turn used for the important parameter for the period of time of the desired broadcast or multicast transmission!

This period of time specifies for all subscribers within a WLAN cell (WLAN hotspot cell) how long ONLY broadcast data flow for. After this period has elapsed, there is then always fundamentally a switch back to the unicast mode, and the reserved bit 606 in the ACI/AIFSN information block 604 is set to 0.

This "Reserved Bit" 502 or 606 is already defined as such in the standard. According to the invention, this bit could be left at "1" in the "AC_BC Parameter Record" until the time for the broadcast has elapsed, and then it becomes "0" at this juncture and also remains as such until the next BC transmission.

In regard to the matching bit in the other four AC parameter records, it can be stated that in this case too it is possible to switch to "1" whenever BC takes place. In line with the standard, the AC parameter elements are transmitted cyclically (with the beacons), that is to say it is thus always clear whether BC or UC mode is being used.

Figure 6B:
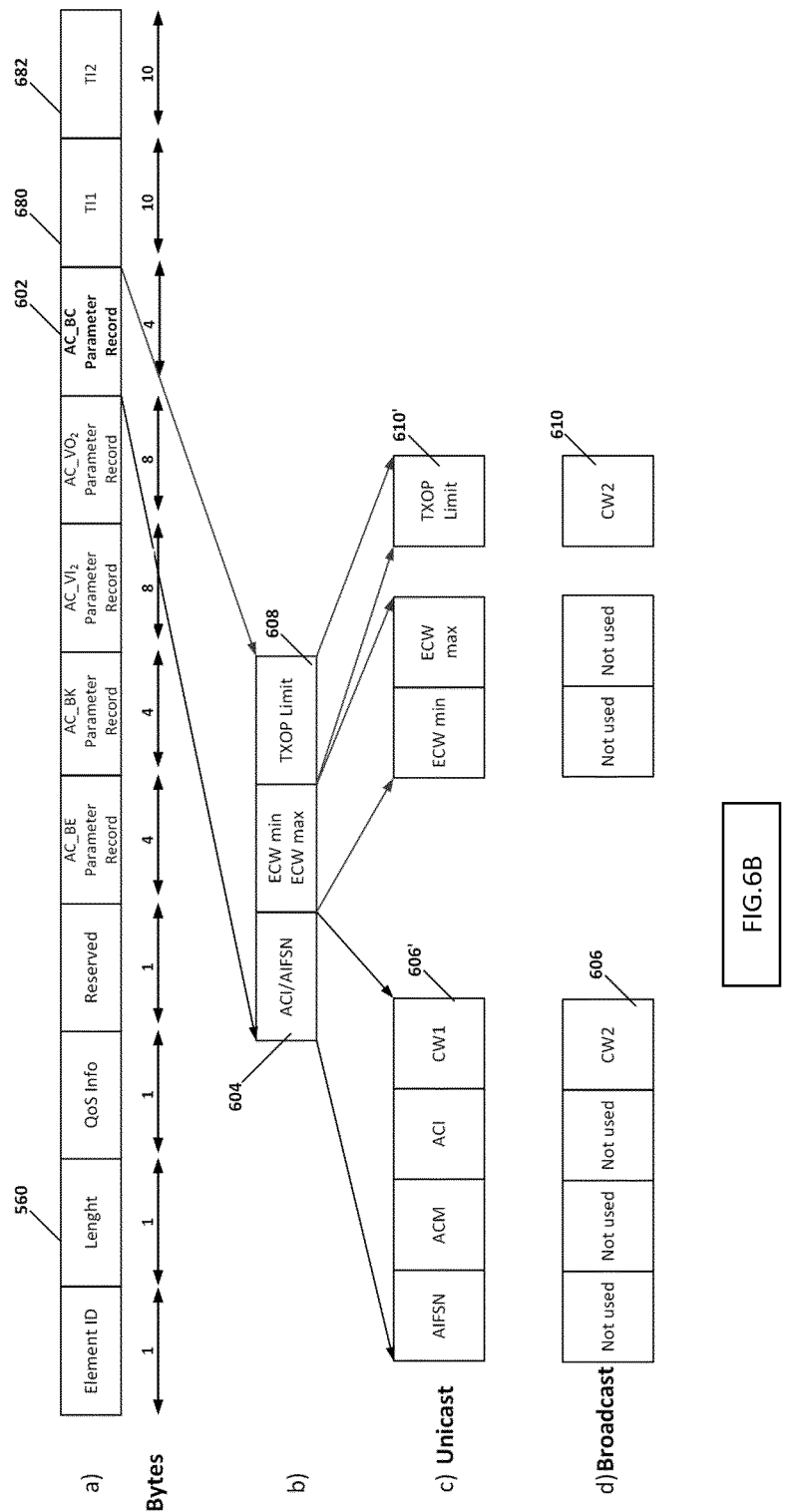
FIG. 6B shows a third exemplary embodiment of an EDCA parameter element modified according to the invention.

FIG. 6B shows yet another exemplary embodiment of an EDCA parameter element according to the invention. In this exemplary embodiment, the transmission mode indicator 606/606' can either be included in the additional EDCA partial parameter element 602 (according to FIG. 6A) or can be included in one or more of the existing partial parameter elements (according to FIG. 6). In the latter case, the partial parameter element 602 is absent in FIG. 6B.

The length indicator 560 of the EDCA parameter element is 1 byte long, as already indicated previously, and thus allows a maximum length of 256 bytes for the EDCA parameter element. This affords the opportunity to extend the EDCA parameter element with two time indicators TI1 680 and TI2 682, which then together form the second codeword and are a measure of the length of the broadcast or multicast transmission time intervals (the second time intervals).

If a PTP synchronization system according to IEEE 1588 is used for the time synchronization of the transmitters and receivers, the time should be indicated with an accuracy of 10 bytes. To determine a starting time (for which the time indicator TI1 is responsible) and a stop time (for which the time indicator TI2 is responsible) for a second time interval in the broadcast or multicast transmission, 20 bytes are thus needed, 10 bytes for TI1 and 10 bytes for TI2. In the exemplary embodiment of FIG. 6B, the length indicator 560 therefore indicates a length of 44 bytes for the EDCA parameter element.

In this exemplary embodiment of the EDCA parameter element, a receiver needs to detect both the transmission mode indicator 606/606' and the two time indicators 680 and 682 from the EDCA parameter element. When these indicators are received, the receiver knows that the transmitter switches to a broadcast or multicast transmission mode after a period of TI1 after reception of the indicator 606. The receiver also knows that the transmitter switches to the unicast transmission mode again a period TI2 later.

Figure 10:
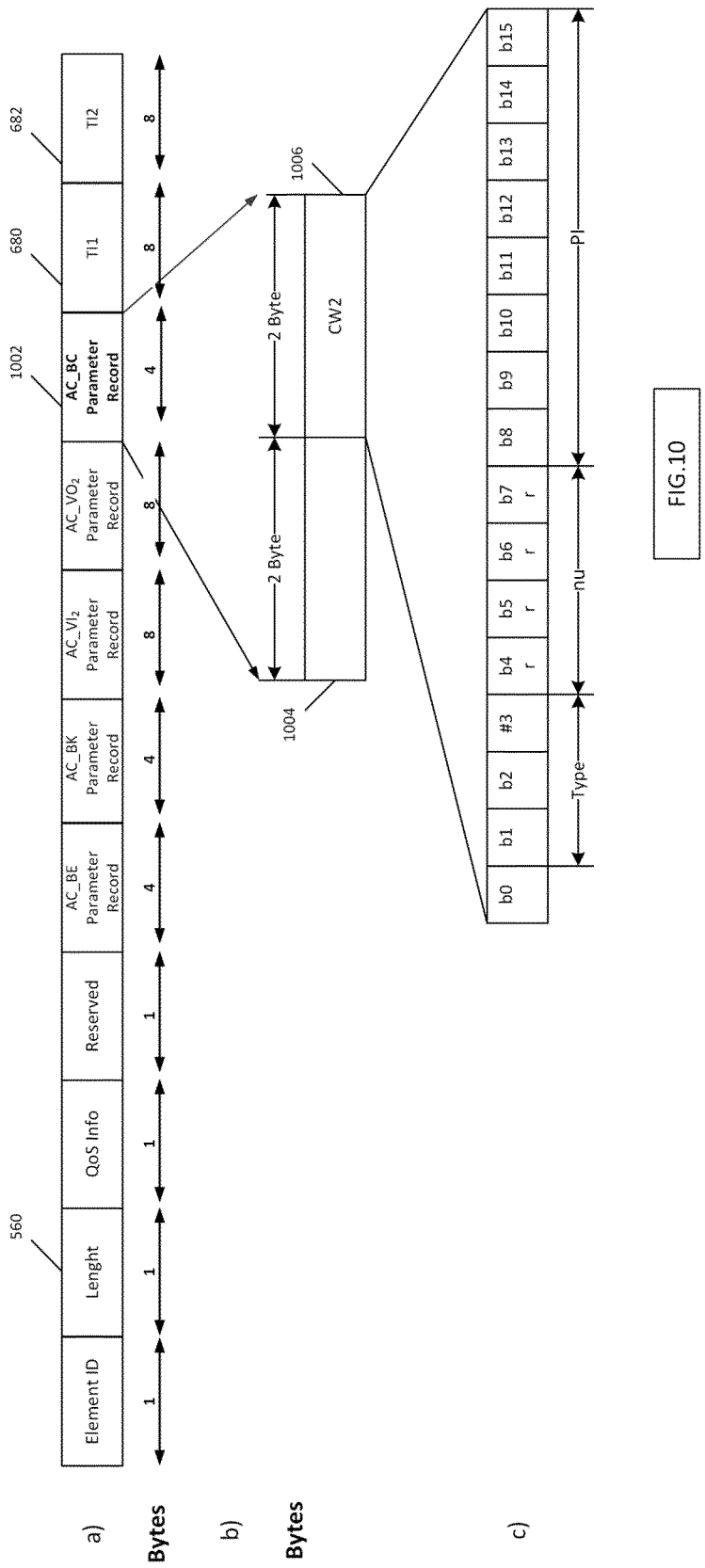
FIG. 10 shows a further exemplary embodiment of the 32-bit AC_BC parameter record.

FIG. 10 shows a further exemplary embodiment of the 32-bit AC_BC parameter record, as is indicated by the reference numeral 602 in FIG. 6B(a), and indicated by 1002 in FIG. 10.

Figure 7:
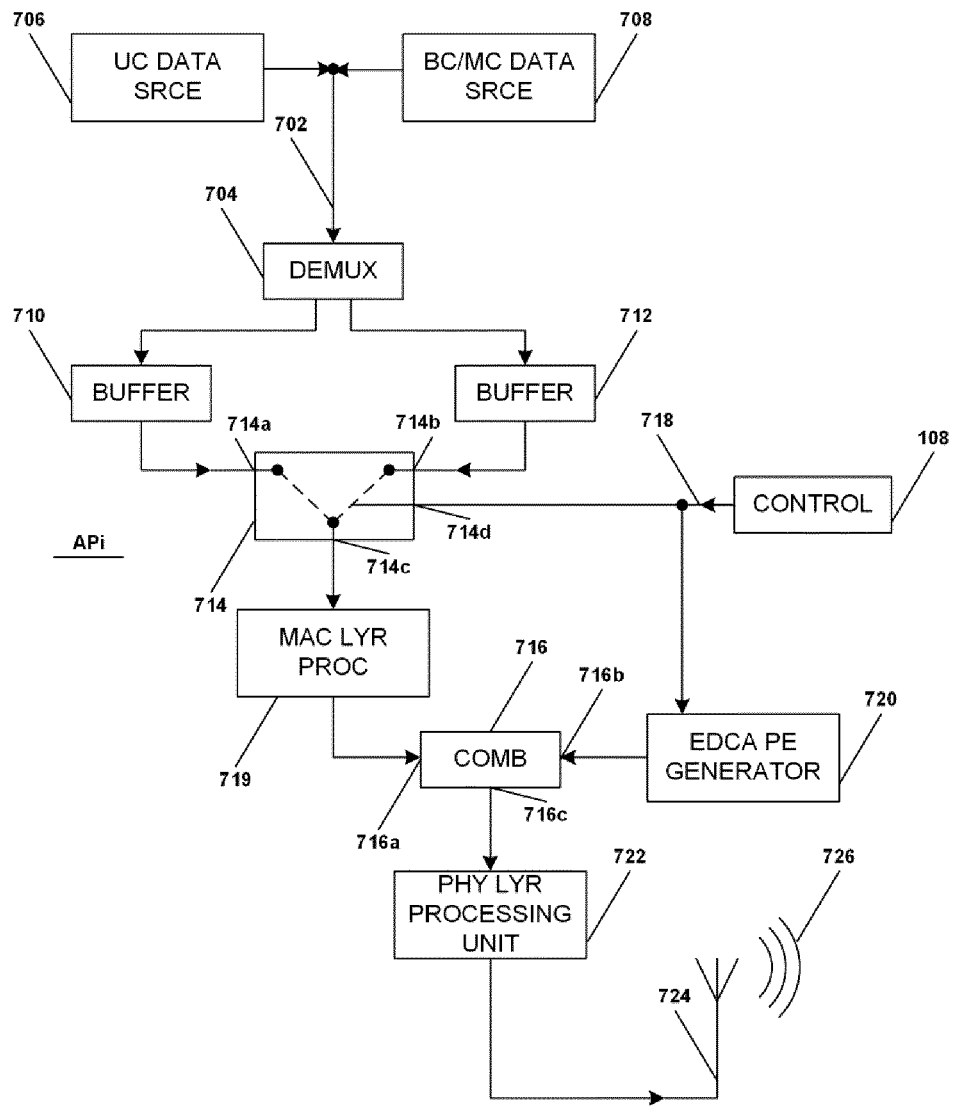
FIG. 7 shows a first exemplary embodiment of a transmitter that can be used in the transmitter network of FIGS. 1, 2, 3 and 4.

The description of this exemplary embodiment is provided only now at the end of the description of the figures. The Transmitter FIG. 7 schematically shows a first exemplary embodiment of a transmitter APi that can be used in the transmitter network of FIGS. 1, 3 and 5. All the circuit elements shown in FIG. 7, apart from the elements 706 and 708, should therefore be thought of as included in the block 524b in FIG. 5. The transmitter APi has an input 702 for receiving the serial datastream of the unicast information to be transmitted or of the broadcast or multicast information. This input 702 is also indicated in FIG. 5 and characterizes the interface between the LLC layer and the 802.11 MAC layer of the stack 520. This information to be transmitted can be supplied via the infrastructure network 510 by external unicast and broadcast or multicast data sources 706 and 708. These sources 706 and 708 may be, e.g., in the PC 514 and/or server 512. Alternatively, these sources may even be arranged 'further away' at a service provider, with these unicast and broadcast or multicast data being received via an LTE antenna on the roof of the building 100 and being forwarded to the PC 514 and/or server 512 via the infrastructure network 510, or these sources with a service provider are connected directly to the network 510 via Internet access lines via a firewall. It should therefore be stressed at this juncture that the sources 706 and 708 are not part of the transmitter according to the invention and defined in the claims.

The input 702 is coupled to an input of a demultiplexer 704 that is provided with two outputs. The first output is coupled to an input of a first buffer memory 710. The second output of the demultiplexer 704 is coupled to an input of a second buffer memory 712.

The demultiplexer 704 is used to derive the unicast data from the serial datastream that is provided at the input 702 and to supply them to the buffer memory 710, so that they can be stored in the buffer memory 710. The demultiplexer 704 is further used to derive the broadcast or multicast data from the serial datastream that is provided at the input 702 and to supply them to the buffer memory 712, so that they can be stored in the buffer memory 712.

The transmitter APi comprises a switching unit 714 having a first input 714a, a second input 714b, an output 714c and having a control input 714d. The first input 714a is coupled to an output of the first buffer memory 710. The second input 714b is coupled to an output of the second buffer memory 712. The output 714c is coupled via a signal processing unit 719 (MAC layer processing unit) to a first input 716a of a signal combining unit 716. The control input 714d is coupled to a control input 718 of the transmitter.

The control input 718 of the transmitter APi is further coupled to an input of an EDCA parameter element generation unit 720. An output of the EDCA parameter element generation unit 720 is coupled to a second input 716b of the signal combining unit 716. An output 716c of the signal combining unit 716 is coupled to an input of a signal processing unit 722 (physical layer processing unit) to convert the output signal at the output 716c of the signal combining unit 716, also known as a DLL (Data Link Layer) information signal to those skilled in the art in the field of the IEEE 802.11 standard specification, into the transmission signal 726, also known as a physical layer (PHY) OFDM signal, which is generated by the block 722 (PHY LYR processing unit), that is transmitted by the transmitter APi via an antenna 724.

In the signal processing unit 719, the unicast data or the broadcast or multicast data are mustered into data frames and additionally the control frames and the management frames/beacon frames are included in a serial datastream (with the EDCA parameter generation unit 720 and the combining unit 716 also playing a part, and therefore being able to be regarded as part of the MAC signal processing, as described in the MAC layer of the IEEE 802.11 standard specification. At the output 716c, the DLL information signal (or MAC information signal) is then present. The broadcast multicast data that are then transmitted by all the APs using the physical broadcast mode (as described) also first need to be packed into MAC packets (in accordance with FIG. 5) by their source (BC/MC source), this possibly being, e.g., an IP video. Block 719 then, under the control of the control block 108, modulates the broadcast data onto the OFDM symbols!

The signal processing unit 722 processes the DLL information signal as described in the physical layer of the IEEE 802.11 standard specification. This involves, e.g., an OFDM modulation method and/or a coding method being performed for the DLL information signal to obtain the transmission signal 726.

The procedure for the transmitter APi is as follows.

First, it is assumed that the transmitter APi transmits in a unicast transmission mode.

As the unicast data are not transmitted by the transmitter continually, but rather only in the first time intervals, see FIG. 1, the first buffer memory 710 is provided. The reason is that, during the second time intervals, no unicast data are transmitted, and therefore the unicast data supplied to the transmitter by the unicast data source 706 need to be buffer-stored in the first buffer memory 710 in the meantime.

The control unit 108 controls the transmitter APi by virtue of a first control signal being supplied to the control input 718. Under the influence of this first control signal, the switching unit 714 is in a position in which the first input 714a is connected to the output 714c.

Under the influence of this first control signal (not shown as such), unicast data are read from the first buffer memory 710 and supplied to the first input 716a of the signal combining unit 716 via the switching unit 714, and the subsequent MAC layer signal processing unit 719.

Under the control of the first control signal from the control unit 108, the EDCA parameter element generation unit 720 generates EDCA parameter elements as are shown in FIG. 6, FIG. 6A or FIG. 6B, and a corresponding EDCA parameter element is then stored or inserted in/into a beacon frame.

In a first exemplary embodiment, as already discussed in regard to FIG. 6, the EDCA partial parameter element 502' comprises a first codeword equal to '0'. In a second exemplary embodiment, as already discussed in regard to FIG. 6A, the EDCA partial parameter element 502" comprises a first codeword equal to '0'.

Figure 8:
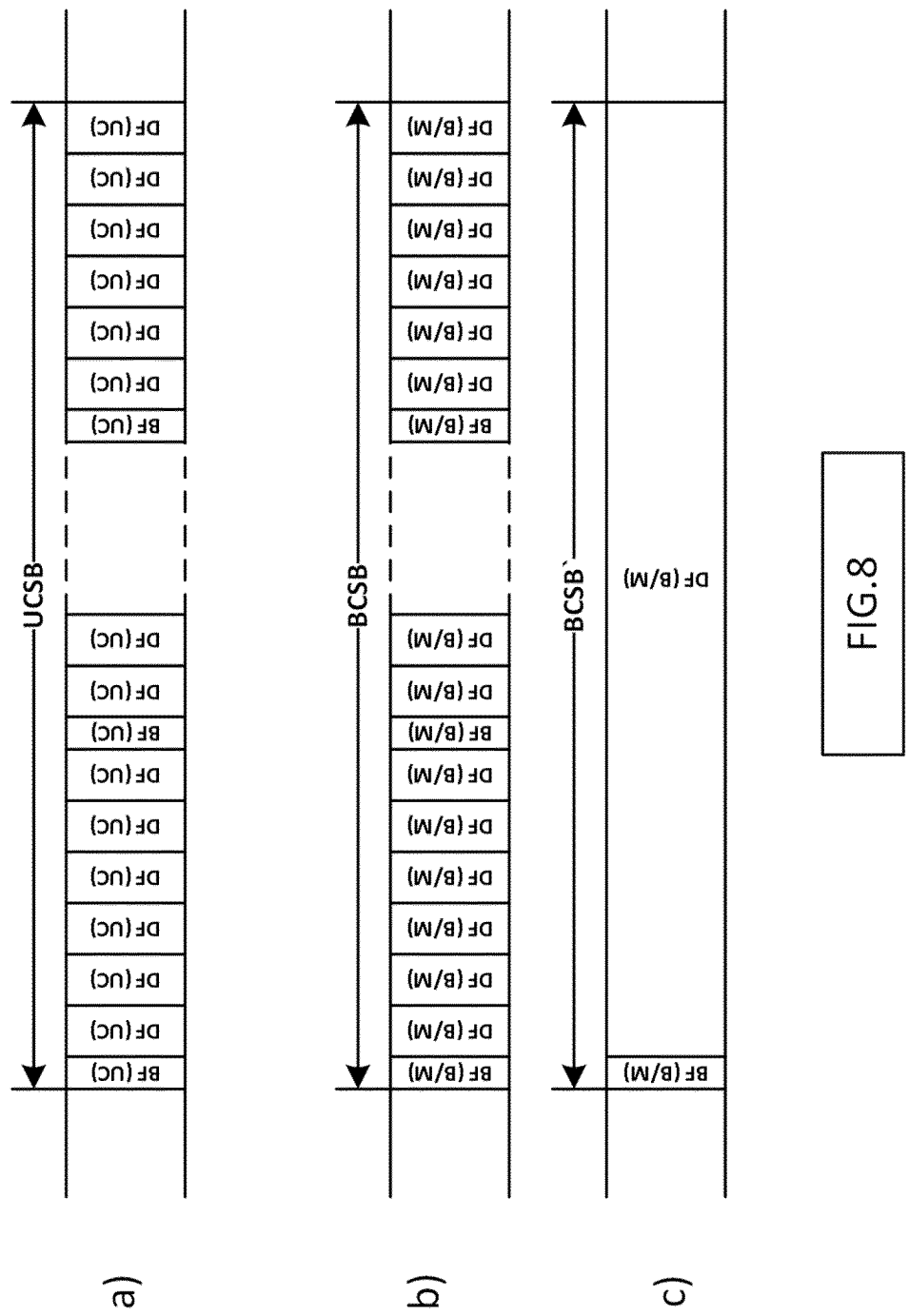
FIG. 8 shows a few unicast data frames and a few broadcast or multicast data frames in the transmission signal of a transmitter.

The signal combining unit 716 accommodates blocks of unicast data (which may comprise a plurality of unicast data frames) and the beacon frames provided with an EDCA parameter element as described above in a serial datastream. FIG. 8A schematically shows a unicast data block UCSB, like UC1 in FIG. 2, in this serial datastream of unicast data frames, indicated as DF(UC), which are preceded by the beacon frames BF(UC), which indicate that a unicast transmission mode is active. This serial datastream, indicated as DLL information signal above, is converted by OFDM modulation and/or another coding method in the signal processing unit 722 into a transmission signal 726 that is transmitted via the antenna 724.

The control unit 108 now controls the transmitter APi such that a second control signal is supplied to the control input 718, so that the transmitter now operates in the broadcast or multicast transmission mode.

As the broadcast or multicast data are not always transmitted continually by the transmitter, the second buffer memory 712 is provided. The reason is that, during the first time intervals, only unicast data are transmitted, of course. Therefore, the broadcast or multicast data supplied to the transmitter by the broadcast/multicast data source 708 need to be buffer-stored in the second buffer memory 712 during these first time intervals.

Under the influence of this second control signal (not shown as such), the switching unit 714 is in a position in which the second input 714b is connected to the output 714c.

Under the influence of this second control signal, broadcast or multicast data are read from the second buffer memory 712 and supplied to the first input 716a of the signal combining unit 716 via the switching unit 714, and via the MAC layer signal processing unit 719.

Under the control of the second control signal from the control unit 108, the EDCA parameter element generation unit 720 generates EDCA parameter elements as are shown in FIG. 6 or FIG. 6A or FIG. 6B, and a EDCA parameter element is then stored in a beacon frame, that is to say is present in the beacon.

In a first exemplary embodiment, as already discussed in regard to FIG. 6, the EDCA partial parameter element 502" comprises a first codeword equal to '1'. Moreover, in a second exemplary embodiment, as already discussed in regard to FIG. 6A, the EDCA partial parameter element 606 comprises a first codeword equal to '1'.

The signal combining unit 716 accommodates blocks of broadcast or multicast data (which can comprise a plurality of BC/MC data frames) and the beacon frames provided with an EDCA parameter element as described above in a serial datastream. FIG. 8B schematically shows a broadcast/multicast data block BCSB, like BC1 in FIG. 2. This serial datastream comprises broadcast/multicast data frames that are preceded by the beacon frames BF(B/M), which indicate that a broadcast or multicast transmission mode is active.

This serial datastream, indicated as DLL information signal above, is converted by OFDM modulation and/or another coding method in the signal processing unit 722 into a transmission signal 726 that is transmitted via the antenna 724.

In a further embodiment, the EDCA parameter element generation unit 720, during the switch from unicast to broadcast or multicast transmission, additionally inserts in the EDCA parameter element a second codeword that is a measure of the length of a second time interval, see FIG. 6D, the partial element 504, FIG. 6A(d), the partial element 610, and in FIG. 6B, a second codeword consisting of the indicators TI1 680 and TI2 682.

Figure 7A:
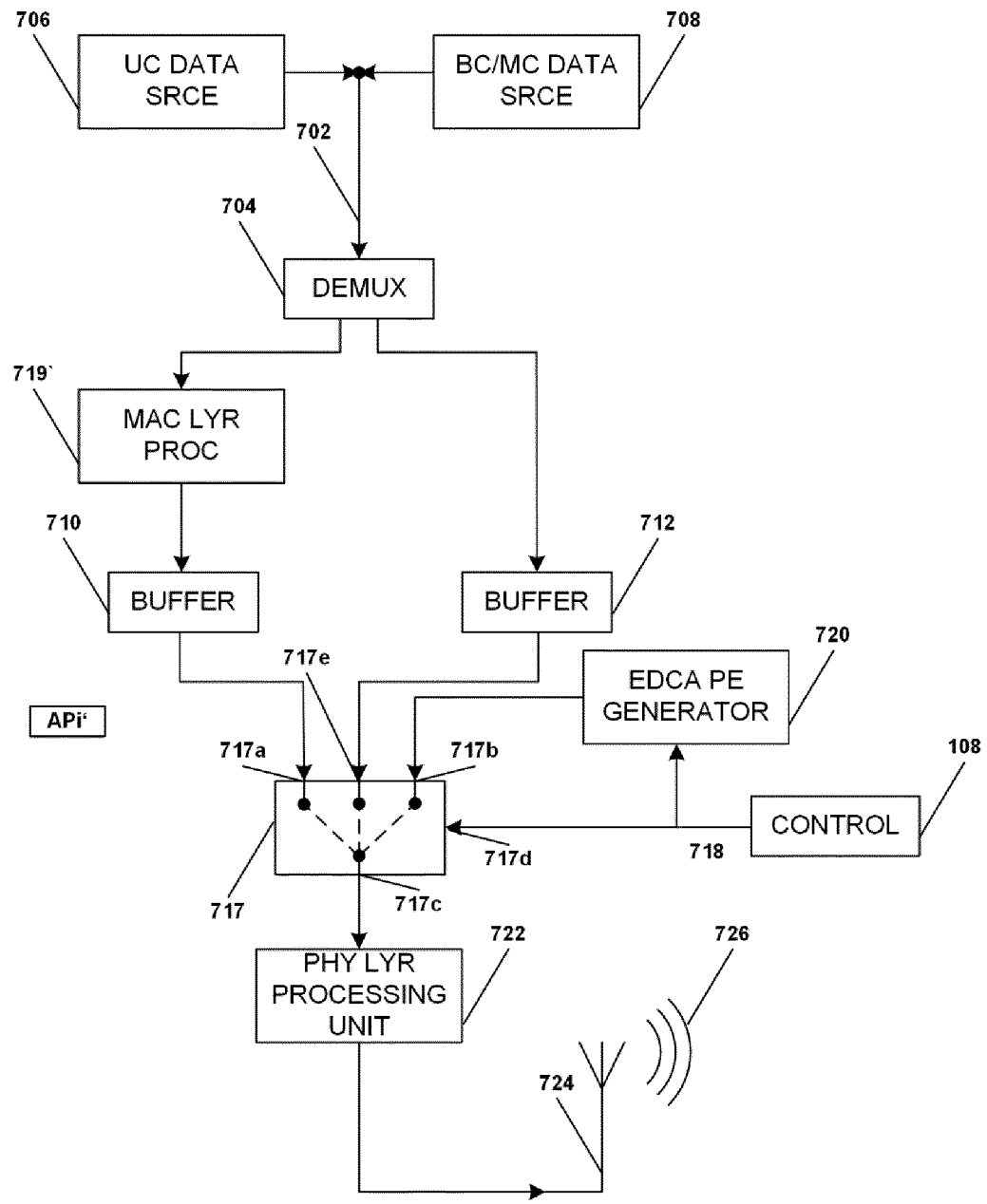
FIG. 7A shows a second exemplary embodiment of a transmitter that can be used in the transmitter of FIGS. 1, 2A, 3 and 4A.

FIG. 7A schematically shows a second exemplary embodiment of a transmitter APi that can be used in the transmitter network of FIGS. 1, 3 and 5. It again holds that all the circuit elements shown in FIG. 7A, apart from the elements 706 and 708, are thought of as being included in the block 524b in FIG. 5.

The exemplary embodiment in FIG. 7A has a very similar appearance to the exemplary embodiment in FIG. 7. The difference between the two transmitters is actually only that the MAC layer signal processing unit 719 in FIG. 7 is arranged at a different point in the circuit design of the transmitter in FIG. 7A, and is indicated by the reference numeral 719' therein.

This further results in the switch 714 and the signal combining unit 716 in FIG. 7 being mustered in a switching unit 717 in FIG. 7A.

For the exemplary embodiment in FIG. 7A, this means that the switch between unicast transmission and BC/MC transmission now takes place between the MAC layer signal processing 719' and the PHY layer signal processing 722. This exemplary embodiment has an additional advantage, because the format in which the broadcast or multicast data are transmitted in the BC/MC transmission mode can be chosen freely. This can then lead to a transmission of the BC/MC data, as are shown in FIGS. 2A and 4A, and additionally also in FIG. 8(c). In this case, a beacon frame having an EDCA parameter element needs to be produced only once, the first codeword in a partial element of the EDCA parameter element being able to have a value equal to '1', and the second codeword in this partial element being able to have any value, and hence the subsequent BC/MC data frame DF(BC/MC) being able to have any length, which may be much longer than the unicast data frames DF(UC), as shown in FIG. 8(c).

The Receiver

Figure 9:
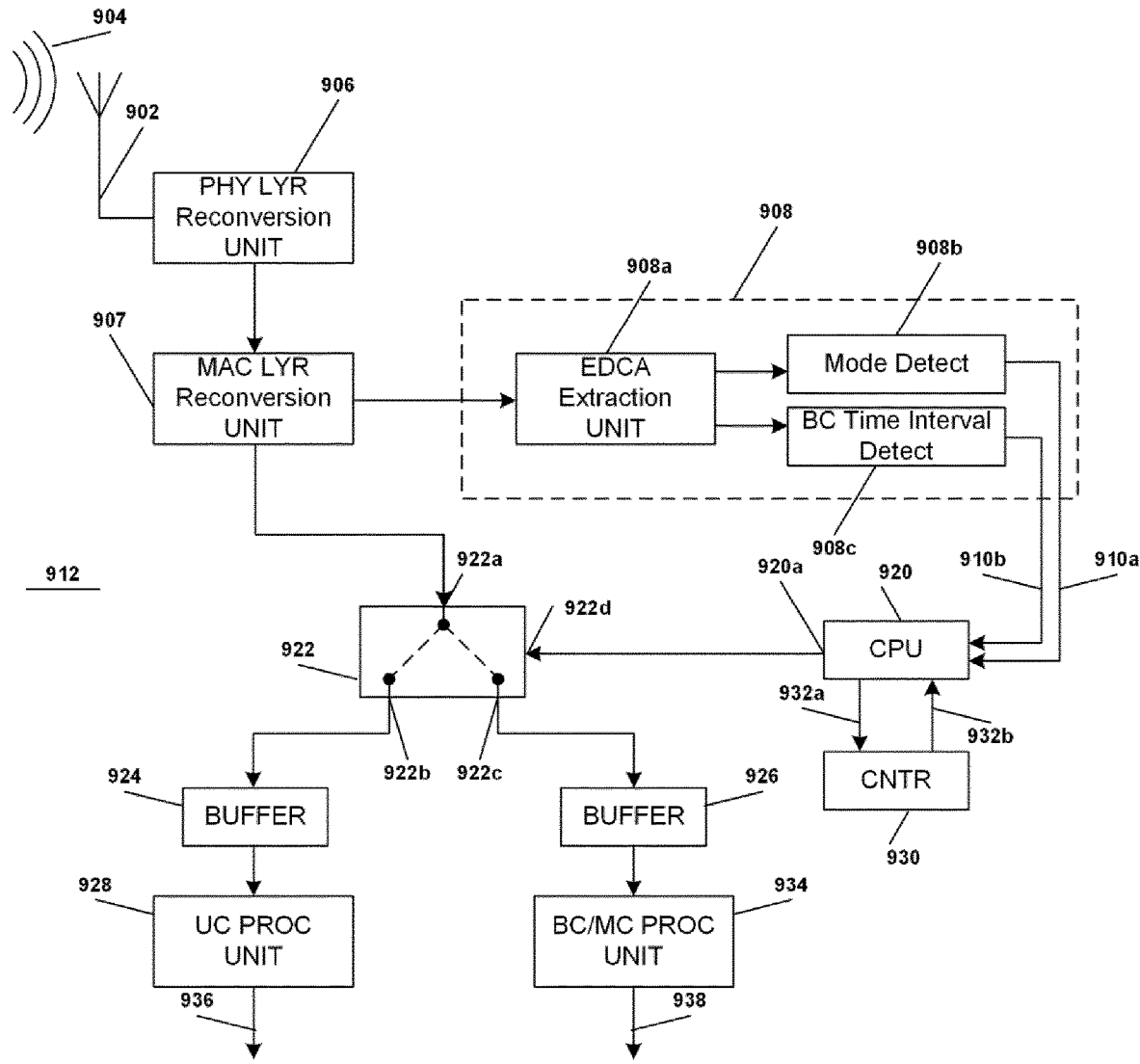
FIG. 9 shows a first exemplary embodiment of a receiver that can be used in the transmitter network of FIGS. 1, 2, 3 and 4.

FIG. 9 shows a first exemplary embodiment of a receiver 912, like receiver 112 in FIG. 1, that can be used in the transmitter network of FIGS. 1, 3 and 5. In particular, the receiver in FIG. 9 can cooperate with the transmitter of FIG. 7, to receive the transmission signal of the receiver of FIG. 7. All the circuit elements shown in FIG. 9 should be thought of as being included in the block 518 in FIG. 5.

The receiver 912 in FIG. 9 comprises an antenna 902 for receiving a transmission signal 904 that is transmitted by a transmitter APi. In this exemplary embodiment of the receiver, the receiver is suitable for receiving the transmission signal of the transmitter of FIG. 7.

The antenna 902 is coupled to an input of a converter unit 906 (Physical Layer Reconversion Unit) for converting the transmission signal 906 into a DLL (Data Link Layer)

information signal. This converter unit 906 reverses the signal processing that has been performed at the transmitter end in the physical layer of the IEEE 802.11 signal processing protocol on the information to be transmitted, like the modulation and/or coding method, by means of an OFDM demodulation and/or decoding method. At the output of the converter unit 906 there is now a serial datastream that comprises both data frames and beacon frames. The beacon frames each comprise an EDCA parameter element. This datastream is converted on a second converter unit 907 (MAC LYR reconversion unit) for converting the DLL information signal into an information signal that is supplied to a terminal 922 of a switching unit 922. This converter unit 907 reverses the signal processing that has been performed at the transmitter end in the MAC layer of the IEEE 802.11 signal processing protocol on the information to be transmitted. An EDCA extracting unit 908 is provided. This extracting unit 908 is adapted to derive the EDCA parameter elements from the DLL information signal, in block 908*a*, to detect the value of the first codeword 502 (see FIG. 6) or 606 (see FIG. 6A), which indicates the transmission mode of the transmitter APi, from an EDCA partial parameter element. To this end, a mode detection device 908*b* is provided. If need be, the second codeword 504 (see FIG. 6) or 610 (see FIG. 6A) or 680/682 (see FIG. 6B), which is a measure of the length of the BC/MC transmission mode, is also detected from this EDCA partial parameter element. In this case, a BC/MC time interval detection device 908*c* is then additionally provided. The extracting unit 908 therefore generates a control signal 910*a* (if only the detection device 908*b* is present) or two control signals 910*a* and 910*b* (if additionally the detection device 908*c* is also present), which is or are supplied to a central control unit (CPU 920). If need be, a counter 930 is also provided that is coupled to the central control unit 930 via lines 932*a* and 932*b*.

The receiver 912 comprises a switching unit 922, having an input 922*a* coupled to the output of the converter unit 907, a first and a second output 922*b*, 922*c*, and having a control input 922*d*. A control signal output 920*a* of the central control unit 920 is coupled to the control input 922*d* of the switching unit 922.

The receiver 912 further comprises a first buffer memory 924, a second buffer memory 926, a unicast signal processing unit 928 and a broadcast or multicast signal processing unit 934. The output 922*b* of the switching unit 922 is coupled to an input of the buffer memory 924. The output 922*c* of the switching unit 922 is coupled to an input of the second buffer memory 926. An output of the first buffer memory 924 is coupled to an input of the unicast signal processing unit 928. An output of the second buffer memory 926 is coupled to an input of the broadcast or multicast signal processing unit 934.

The receiver 912 operates as depicted in more detail at this juncture below. In this case, it is first of all assumed here that the user of the receiver is interested both in the broadcast or multicast transmission and in the unicast transmission, e.g., because he wants to simultaneously download a file from the Internet.

It is first of all assumed that the transmitter APi transmits in a unicast transmission mode. The receiver 912 receives the transmission signal from a transmitter APi. In this serial transmission signal, the EDCA parameter elements (in the beacons) are transmitted at regular intervals of time, and the mode detection unit 908*b* detects that the first codeword (either 502' in FIG. 6, or 606' in FIG. 6A) is equal to '0'. The result of this detection is routed via the line 910*a* to the central control unit 920, and the central control unit 920 generates a control signal at the output 920*a* such that the switching unit 922 is put into a position in which the input 922*a* is connected to the first output 922*b*. The information signal converted by the converter unit 907 is therefore supplied to the first buffer memory 924.

Additionally, the central control unit 920 controls (not shown) the first buffer memory 924 and the unicast signal processing unit 928 so that the information signal converted by the converter unit 907 can be processed further in the unicast reception mode.

First of all, this is achieved by virtue of the converted information signal being stored in the first buffer memory 924. The first buffer memory 924 is needed because the unicast information to be transmitted is transmitted to the receiver on a block-by-block basis (and therefore not continually) in the first time intervals. At the output 936 of the unicast signal processing unit 928, there should generally be a continual unicast information signal available, however. The transmission of the unicast information from the transmitter to the receiver is therefore regulated such that the first memory 924 is half full on average so that, during the second time intervals in which no unicast information is received, the unicast signal processing unit 928 can still read data from the first memory 924 so that it can continue to operate to generate as continual a datastream as possible at the output 936.

If the transmitters APi, under the influence of the control of the control unit 108 (see FIGS. 1 and 3), change their transmission modes, so that they now operate in the broadcast or multicast transmission mode, this means for the receiver 912 that the transmission mode detection unit 908*b* detects a first codeword 606 (502" in FIGS. 6 and 606 in FIG. 6A) equal to '1'.

The result of this detection is routed via the line 910*a* to the central control unit 920, and the central control unit 920 generates a control signal at the output 920*a* such that the switching unit 922 is put into a position in which the input 922*a* is connected to the second output 922*c*. Further, the central control unit 920 controls the first buffer memory 924 such that the reading of data into the first buffer memory 924 is deactivated.

The information signal converted by the converter unit 907 is therefore now supplied to the second memory 926.

Additionally, the central control unit 920 controls (not shown) the second memory 926 and the broadcast or multicast signal processing unit 934 so that they can continue to process the converted information signal in the broadcast or multicast reception mode.

First of all, this is achieved by virtue of the converted information signal being stored in the second buffer memory 926. The second buffer memory 926 is needed because the broadcast or multicast information to be transmitted is transmitted to the receiver on a block-by-block basis (and therefore not continually) in the second time intervals, see inter alia FIG. 2. At the output 938 of the broadcast or multicast signal processing unit 934, there should be a continual broadcast or multicast information signal available, however. The transmission of the broadcast or multicast information from the transmitter to the receiver is therefore such that the second memory 926 is half full on average so that, during the first time intervals in which no broadcast or multicast information is received, the broadcast or multicast signal processing unit 934 can still read data from the second memory 926 so that it can continue to operate to generate a continual datastream at the output 938.

Moreover, the time interval detection unit 908*c* detects a second codeword (504 in FIG. 6 or 610 in FIG. 6A or 680/682 in FIG. 6B) that is a measure of the length of the second time interval of the broadcast or multicast transmission mode. In the exemplary embodiments of FIG. 6 and FIG. 6A, the second codeword is a particular value. This value is supplied from the detection unit 908c via the line 910b to the central control unit 920. The central control unit 920 stores this value in the counter 930 via the line 932a. In this exemplary embodiment, the counter 930 begins to count down until the numerical value '0' is reached. Using the line 932b, the counter 930 then sends a stop control signal to the central control unit 920. Under the influence of this stop signal, the central control unit 920 controls (not shown) the switching unit 922 to switch the switching unit 922 to the other position and controls the second buffer memory 926 and the BC/MC signal processing device 938 such that the reading of data into the second buffer memory 926 is deactivated. In the exemplary embodiment described above, the counter 930 counts down to 'zero' from the numerical value derived from the second codeword 504 or 610. Other procedures of the counter 930 are naturally equally possible. In this context, it is possible to think, e.g., of an exemplary embodiment in which the counter 930 is now counting up from 'zero' up to the numerical value derived from the second codeword 504 or 610.

If the second codeword is a codeword according to FIG. 6B, two values TI1 and TI2 are therefore detected and routed to the control unit 920. The counter 930 then comprises two subcounters 930a and 930b, not shown. The value TI1 is now stored in the subcounter 930a and determines the length of the time interval between reception of the first codeword and the present switching of the receiver from the unicast reception mode to the broadcast or multicast reception mode. The value TI2 is stored in the subcounter 930b and then determines the length of the time interval in which the receiver remains in the broadcast or multicast reception mode until it switches to the unicast reception mode again.

Let us now assume that the user of the receiver is interested only in reception of the unicast transmission. This means that, on reception of the first codeword equal to '1', the central control unit 920 controls the first buffer memory 924 such that, during a second time interval of the broadcast or multicast transmission of a transmitter, the reading of data into the first buffer memory 924 is deactivated. Moreover, the switch 922 will not switch to the other position, and no data are read into the buffer memory 926 either.

Figure 9A:
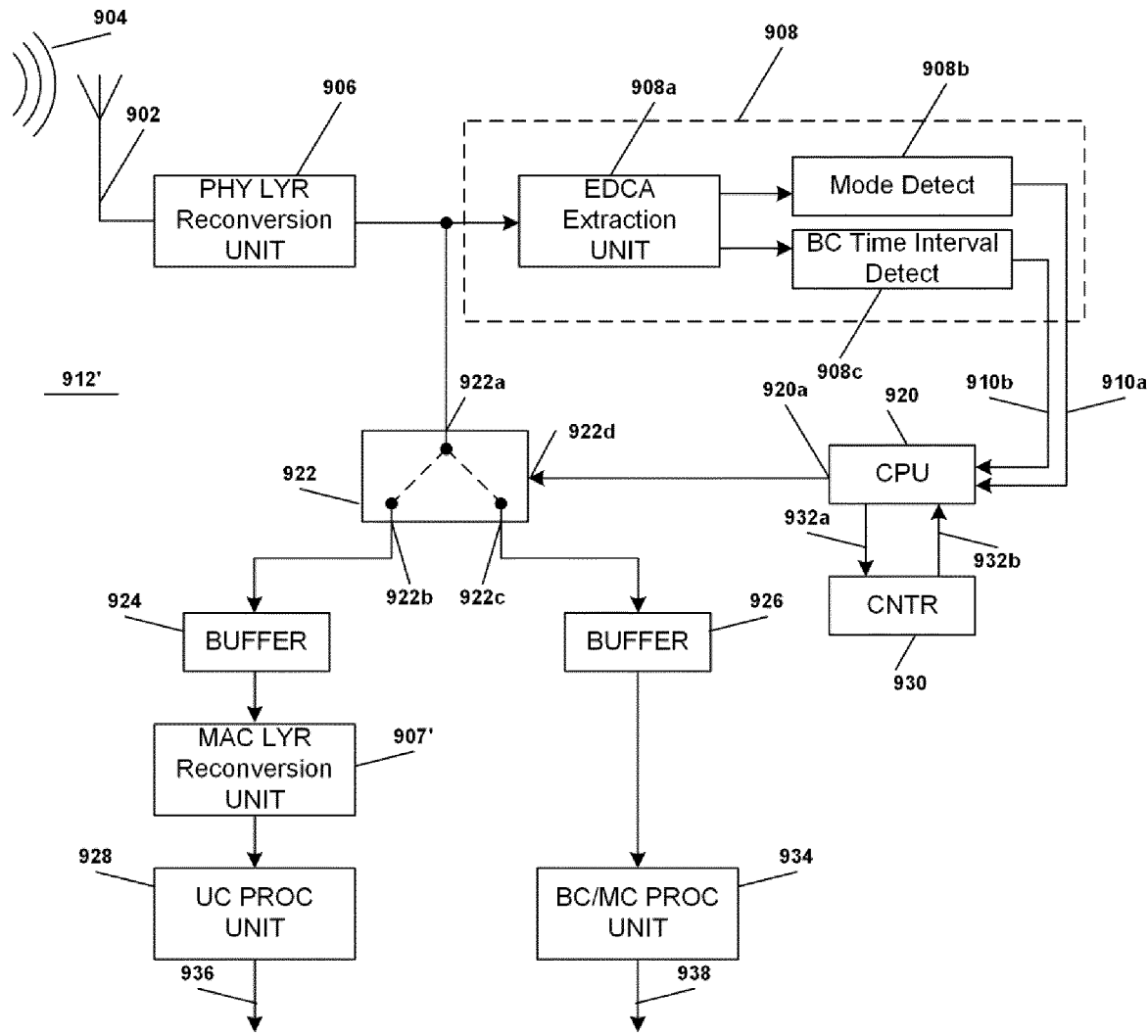
FIG. 9A shows a second exemplary embodiment of a receiver that can be used in the transmitter network of FIGS. 1, 2A, 3 and 4A.

Let us now assume that the user of the receiver is interested only in reception of the broadcast or multicast transmission. This means that, on reception of the first codeword '0', the central control unit 920 controls the second buffer memory 926 such that, during first time intervals of the unicast transmission of a transmitter, the reading of data into the second buffer memory 926 is deactivated. Moreover, the switch 922 will not switch to the other position, and no data are read into the buffer memory 924. FIG. 9A shows a second exemplary embodiment of a receiver 912', like receiver 112 in FIG. 1, that can be used in the transmitter network of FIGS. 1, 3, and 5. In particular, the receiver in FIG. 9A can cooperate with the transmitter of FIG. 7A, to receive the transmission signal of the receiver of FIG. 7A. All the circuit elements shown in FIG. 9A should be thought of as being included in the block 518 in FIG. 5.

The exemplary embodiment in FIG. 9A has a very much resembles the exemplary embodiment in FIG. 9. The difference between the two receivers is actually only that the MAC layer converter unit 907 in FIG. 9 is arranged at a different point in the circuit design of the receiver 912' in FIG. 9A, and is indicated by the reference numeral 907' therein.

For the exemplary embodiment in FIG. 9A, this means that the switch between unicast transmission and BC/MC transmission now takes place between the PHY layer converter unit 902 and the MAC layer converter unit 907'. This exemplary embodiment has an additional advantage, because the format in which the broadcast or multicast data are transmitted in the BC/MC transmission mode can be chosen freely. This can then lead to a transmission of the BC/MC data, as are shown in FIGS. 2A and 4A, and additionally also in FIG. 8(c). In this case, a beacon frame having an EDCA parameter element needs to be detected in the detection unit 908b only once, the first codeword in a partial element of the EDCA parameter element being able to have a value equal to '1', and the second codeword in this partial element being able to have any value, and hence the subsequent BC/MC data frame DF(BC/MC) being able to have any length, which may be much longer than the unicast data frames DF(UC), as shown in FIG. 8(a).

Further Exemplary Embodiment in the Description of the WLAN Transmission Link

FIG. 10 shows a further exemplary embodiment of the 32-bit AC_BC parameter record, as indicated by the reference numeral 602 in FIG. 6B(a), and indicated by 1002 in FIG. 10.

In the exemplary embodiment today, the first two bytes (indicated by the reference numeral 1004) of the AC_BC parameter record 1002, see FIG. 10(b), possibly contain the first codeword that indicates the unicast transmission mode or the broadcast or multicast transmission mode (see, e.g., FIG. 6B(c) and (d), the codeword 606/606').

Further, FIG. 10(c) shows the structure of the last two bytes (indicated by the reference numeral 1006 in FIG. 10(b)) of the AC_BC parameter record 1002. This field 1006 is indicated as broadcast start/stop (BC-SST) field.

Bit $b_0=0$ means that no information is transmitted in bits $b_8$-$b_{15}$ in this AC-BC parameter record currently being evaluated. By contrast, bit $b_0=1$ means that a piece of pointer information PI is transmitted in bits $b_8$-$b_{15}$. Bits $b_1$ to $b_3$ represent eight possible types (TYPE) in this case for how the pointer information PI is to be interpreted. At present, three cases of bit combinations are defined:
1) 000➔ Start/Stop—absolute time information
2) 001➔ Start/Stop—in frames after Nst frames start/in frames after Nsp frames stop
3) 010➔ Start after NanzStart/Stop after NanzStop, the number of frames is counted
4) 011-111➔ reserved for future applications Bits $b_4$ to $b_7$ are currently not used (NU, and likewise remain reserved for future applications). Bits $b_8$-$b_{15}$ mean a piece of pointer information PI, with the exact point (the exact beginning) within the EDCA parameter element of FIG. 10(a) being characterized. In this case, a number from 0-127 ($2^8$) can be depicted. The number corresponds to the number of bytes that need to be counted off directly subsequently to the CW2 field in order to directly obtain the first byte of a 20-byte piece of time or counter information. If, e.g., the pointer information is thus PI=0, then this means that the CW2 field is immediately followed by the first byte of the 20-byte time or counter information, as also shown in FIG. 10(a). If, e.g., the pointer information is =28, then this means that 28 bytes need to be counted off immediately after the CW2 field in order to get to the beginning of the 20-byte time or counter information. This is, e.g., for the case in which the AC_BC parameter record is not at the end in an EDCA parameter element.

Re 1):

The 20 bytes contain two 10-byte pieces of time information, the absolute start time and the absolute stop time. The two time statements correspond to the time stamp format or the standard that is used for the precision time protocol (PTP) (48-bit unsigned seconds, 32-bit unsigned nanoseconds). Following evaluation of this absolute time information, it is possible to switch to and fro between unicast and broadcast exactly in the grid spacing of OFDM symbols in WiFi.

Re 2):

The 20 bytes contain two 10-byte pieces of counter information, the first 10 bytes being a start counter and the second 10 bytes being a stop counter, with the stop counter always having a higher value than the start counter. Whenever a beacon frame has been received, the two counters are counted down. When the count value of the start counter reaches the value zero, this means that a switch from the unicast to the broadcast mode takes place. When the count value of the stop counter reaches the value zero, this means that a switch back from the broadcast to the unicast mode takes place.

Re 3):

The 20 bytes contain two 10-byte pieces of counter information, the first 10 bytes being a start counter, the second 10 bytes being a number counter. Whenever a beacon frame has been received, the start counter is counted down, the number count value remaining unaffected in this case. When the count value of the start counter reaches the value zero, this means that a switch from the unicast to the broadcast mode takes place. Whenever a beacon frame has subsequently been received, the number counter is counted down until it reaches the value zero, and then a switch back from the broadcast to the unicast mode takes place.

From what has been described here in connection with the exemplary embodiment of FIG. 10, it is clear that the presence of the first codeword is not necessary in this case.

The receivers as shown in FIGS. 9 and 9A should be capable of reading and processing the information comprised in the CW2 fields when EDCA parameter elements are received as shown in FIG. 10, however.

This means that the extracting unit 908/908a, as shown in FIGS. 9 and 9A, has to detect and read the field 1006 (CW2). The counter 930 then determines the length of a second time interval by counting (absolute) time pulses or reception and detection of beacon frames.

In summary, the switch between unicast transmission and broadcast or multicast transmission takes place as follows:

In one exemplary embodiment, there is only the first codeword. When a first value of the first codeword is detected, a switch from unicast reception to broadcast or multicast reception takes place. Moreover, when a second value of the first codeword is detected, a switch from broadcast or multicast reception to unicast reception takes place.

In another exemplary embodiment, there is only the second codeword. The second codeword can comprise, e.g., a time value. When the occurrence of the second codeword is detected, a switch from unicast reception to broadcast or multicast reception takes place. After a time interval whose length matches the cited time value, a switch from broadcast or multicast reception to unicast reception takes place.

In a further exemplary embodiment with just the second codeword, the second codeword comprises a first and a second time value. When the occurrence of the second codeword is detected, a switch from unicast reception to broadcast or multicast reception takes place after a time interval whose length matches the first time value. After a further time interval, whose length matches the second time value, a switch from broadcast or multicast reception to unicast reception takes place.

In yet a further exemplary embodiment with just the second codeword, the second codeword can comprise, e.g., a numerical value. When the occurrence of the second codeword is detected, a switch from unicast reception to broadcast or multicast reception takes place. Thereafter, beacon frames that occur in the received transmission signal following the switch to broadcast or multicast reception are counted. If the same number of beacon frames according to the numerical value is counted, a switch from broadcast or multicast reception to unicast reception takes place.

Yet another possibility is that the second codeword comprises a first and a second numerical value. After detection of the occurrence of the second codeword, beacon frames are counted until the number of beacon frames counted matches the first numerical value. A switch from unicast reception to broadcast or multicast reception then takes place. Thereafter, beacon frames are counted that occur in the received transmission signal after the switch to broadcast or multicast reception. If the same number of beacon frames according to the second numerical value is counted, a switch from broadcast or multicast reception to unicast reception takes place.

Yet another possibility again is that both the first codeword and the second codeword are present. The second codeword can comprise, e.g., a time value or a numerical value. When the occurrence of the first codeword is detected in the received transmission signal, a switch from unicast reception to broadcast or multicast reception takes place.

If the second codeword comprises a time value, then a switch from broadcast or multicast reception to unicast reception takes place after a time interval whose length matches the cited time value.

If the second codeword comprises a numerical value, then beacon frames are counted that occur in the received transmission signal after the switch to broadcast or multicast reception. If the same number of beacon frames according to the numerical value is counted, a switch from broadcast or multicast reception to unicast reception takes place.

Yet another possibility again is that both the first codeword and the second codeword are present, the second codeword comprising two time values or two numerical values.

If the second codeword comprises two time values, a switch from unicast reception to broadcast or multicast reception takes place when the occurrence of the first codeword is detected in the received transmission signal after a time interval that matches the first time value. After a further time interval, which matches the second time value, a switch from broadcast or multicast reception to unicast reception takes place.

If the second codeword comprises two numerical values, the number of beacon frames occurring in the transmission signal is counted until a number of beacon frames equal to the first numerical value has been counted. A switch from unicast reception to broadcast or multicast reception then takes place. Thereafter, counting is continued until a number of beacon frames equal to the second numerical value has been counted. A switch from broadcast or multicast reception to unicast reception then takes place.

It should be mentioned at this juncture that all the exemplary embodiments can be realized either in hardware or in software. The software solution could be stored, e.g., as an App in an existing device to realize the operation of the transmitter or receiver.

All the possible exemplary embodiments will now be repeated.

A. In a first exemplary embodiment of a transmitter network, the transmitter network is provided with at least two transmitters (AP1, AP2, . . . ) that transmit in the same frequency range, wherein in a unicast transmission mode of the transmitters, the transmitters are adapted to transmit unicast information packets (UC) in successive first time intervals (0-t3; t4-t8; t9-t12; t13-t17; . . . ), wherein the at least two transmitters are further adapted to simultaneously transmit in a broadcast or multicast mode, respectively, broadcast or multicast information (BC) in second time intervals (t3-t4; t8-t9; t12-t13; t17-t18) that lie in between first time intervals, the broadcast or multicast information transmitted by the transmitters in a second time interval being principally equal and being transmitted principally at the same time (FIG. 1, 2).

B. The transmitter network of exemplary embodiment A may have been integrated in a WiFi or WLAN network.

C. In this case, the at least two transmitters (AP1, AP2, . . . ) may be in sync with one another in time.

D. In this case, according to the transmitter network C, the at least two transmitters may be in sync with one another according to the PTP (Precision Time Protocol) protocol standard specification.

E. In all the aforementioned exemplary embodiments, the second time intervals can occur repeatedly.

F. In this case, the second time intervals can further occur repeatedly on a regular basis.

G. Moreover, the lengths of the successive second time intervals may be equal to one another.

H. Transmitter network according to one of the preceding claims, characterized in that in two successive first time intervals the first transmitter is adapted to transmit a unicast information packet in a first time interval of the two successive first time intervals and the second transmitter is silent in this time interval, and the second transmitter is adapted to transmit a unicast information packet in the second time interval of the two successive first time intervals and the first transmitter is silent in this time interval.

I. In all cases, the transmitter network is provided with a central control unit (108a, 108b) for controlling the transmitters in the transmitter network in the unicast transmission mode or the broadcast or multicast transmission mode.

J. In this case, the central control unit (108a, 108b) is adapted to control the length of the successive second time intervals.

K. Software or App to allow the operation of the central control unit (108a, 108b) according to the claims.

L. An exemplary embodiment of a transmitter that can be used in a transmitter network as denoted above is adapted to transmit a WLAN transmission signal, the serial datastream of the WLAN transmission signal repeatedly comprising beacon frames, wherein, further, certain beacon frames comprise at least one from a first and a second codeword, which first codeword can assume a first value that characterizes the unicast transmission mode of the transmitter, and can assume a second value that characterizes the broadcast or multicast transmission mode of the transmitter, and second codeword is a measure of the length of a second time interval of a broadcast or multicast transmission mode.

M. The first codeword (606) may be a 1-bit codeword.

N. In this case, a first 1-bit codeword (606) equal to '1' can characterize the broadcast or multicast transmission mode of the transmitter.

O. Moreover, a first 1-bit codeword (606') equal to '0' can characterize the unicast transmission mode of the transmitter.

P. In a further exemplary embodiment of the transmitter, certain beacon frames may comprise an EDCA (Enhanced Distributed Channel Access) parameter element, which EDCA parameter element comprises the first codeword (606) and/or the second codeword. (FIG. 6, 6A)

Q. In this case, the EDCA parameter element can comprise a partial parameter element (parameter record), the partial parameter element being one of the EDCA partial parameter elements already defined in the WLAN standard specification IEEE 802.11, provided with the first codeword and/or the second codeword. (FIG. 6)

R. Alternatively, the EDCA parameter element can comprise an additional partial parameter element (AC_BC parameter record, 602) that comprises the first codeword and/or the second codeword. (FIG. 6A)

S. The second codeword can comprise an indicator signal and N time indicators, the time indicator(s) being a measure of the length of a second time interval, N being equal to 1 or 2. (FIG. 10)

T. In this case, it is possible for N=2, the time indicators being a measure of a starting time and an end time of a second time interval.

U. Another possibility is that the second codeword comprises an indicator signal and a value, the value being a measure of the number of beacon frames comprised in a second time interval in the transmission signal. (FIG. 10)

V. Certain beacon frames can comprise an EDCA (Enhanced Distributed Channel Access) parameter element, which EDCA parameter element comprises at least one partial element (AC_BC parameter record), and the at least one partial element comprises the indicator signal of the second codeword, and the N time indicators or the value are/is comprised in the transmission signal after the partial element. (FIG. 10)

W. In this case, the EDCA partial parameter element is one of the EDCA partial parameter elements already defined in the WLAN standard specification IEEE 802.11. (FIG. 10)

X. Alternatively, the at least one partial parameter element may be an additional partial parameter element (AC_BC parameter record, 602) that is comprised in the EDCA parameter element, which additional partial element comprises the indicator signal of the second codeword. (FIG. 10)

Y. The transmitter may further be provided with a generation unit (720) for generating the beacon frames, provided with the first and/or second codewords, and the transmitter may further be adapted to combine (716) the beacon frames with the unicast or broadcast or multicast data to produce a serial datastream for transmission.

Z. The transmitter may further be provided with a switching device (714) for switching between the unicast data and the broadcast or multicast data on the basis of the control signal of the central control unit (108, 108', 108").

AA. In this case, the generation unit may be adapted to generate the beacon frames, and the transmitter may be adapted to combine the beacon frames with the unicast or broadcast or multicast data, both on the basis of the control signal of the central control unit (108, 108', 108").

AB. Software or an App may be provided to allow the operation of the transmitter.

AC. An exemplary embodiment of a receiver that can be used in the transmitter network to receive a transmission signal transmitted by a transmitter as described above is adapted, in a unicast reception mode of the receiver, to receive unicast information packets in successive first time intervals, wherein the receiver is further adapted to receive in a broadcast or multicast reception mode, respectively, broadcast or multicast information in second time intervals that lie in between the first time intervals.

AD. In this case, the receiver may further be adapted to store the unicast information packets received in the first time intervals in a first buffer memory (924) and to store the broadcast or multicast information received in the second time intervals in a second buffer memory (926).

AE. In another exemplary embodiment of the receiver, the receiver is adapted to receive from a transmitter in the transmitter network a WLAN transmission signal, the serial datastream of the WLAN transmission signal repeatedly comprising beacon frames, wherein certain beacon frames comprise at least one from a first and a second codeword (502, 606), which first codeword characterizes a transmission mode of a transmitter, and the second codeword is a measure of the length of a second time interval of a broadcast or multicast transmission mode, and the receiver is provided with a detector device (908, 908*b*) for detecting the first and/or the second codeword.

AF. In this case, the first codeword can assume a first value (502', 606') that characterizes the unicast transmission mode of the transmitter, and can assume a second value (502", 606) that characterizes the broadcast or multicast transmission mode of the transmitter, and the receiver is adapted to switch on a unicast reception mode upon detection of the first value of the first codeword, and to switch on a broadcast or multicast reception mode upon detection of the second value of the first codeword.

AG. The first codeword (502", 606) may be a 1-bit codeword, and the receiver (908*b*) may be adapted to switch on a unicast reception mode upon detection of a '0' value of the first codeword, and to switch on a broadcast or multicast reception mode upon detection of a '1' value of the first codeword.

AH. The receiver can comprise a detector device (908*c*) for detecting the second codeword, and the receiver may be adapted to take the value of the detected second codeword as a basis for switching off the broadcast or multicast reception mode.

AI. The receiver may be provided with a counter (930), and the receiver may further be adapted to load the second codeword (504, 610) as a count value in the counter.

AJ. In this case, the counter (930) may be adapted to count down its count value, as of the switch to the broadcast or multicast reception mode, and the receiver may further be adapted to switch its reception mode from the broadcast or multicast mode to the unicast reception mode when the count value zero is reached in the counter.

AK. Further, certain beacon frames can comprise an EDCA (Enhanced Distributed Channel Access) parameter element, which EDCA parameter element comprises the first and/or the second codeword (606), and the detector device may be adapted to detect the first and/or the second codeword from the EDCA parameter element.

AL. The EDCA parameter element can further comprise a partial parameter element, which partial parameter element is one of the EDCA partial parameter elements already defined in the WLAN standard specification IEEE 802.11, and is provided with the first codeword and/or the second codeword, and the detector device may be adapted to detect the first and/or the second codeword from the EDCA partial parameter element.

AM. Alternatively, the EDCA parameter element can comprise an additional partial parameter element (AC_BC parameter record, 602), which additional partial parameter element is provided with the first codeword and/or the second codeword, and the detector device may further be adapted to detect the first and/or the second codeword from the additional EDCA partial parameter element.

AN. The second codeword (CW2, 610) can characterize the length of a second time interval of a broadcast or multicast transmission mode.

AO. The second codeword can comprise an indicator signal and two time indicators, the time indicators being a measure of a starting time and an end time of a second time interval, and the receiver may be adapted to detect the indicator signal and in response thereto to read the two time indicators from the received transmission signal. (FIG. 10)

AP. The second codeword can also comprise an indicator signal and a value, the value being a measure of the number of beacon frames that are comprised in the transmission signal in a second time interval, and the receiver may further be adapted to detect the indicator signal and in response thereto to read the value from the received transmission signal. (FIG. 10)

AQ. Software or App may be provided to allow the operation of the receiver according to the invention.

AR. The transmitter may further also be adapted to switch a transmission mode from a unicast transmission mode to a broadcast or multicast transmission mode and vice versa on the basis of a control signal that is supplied by a central control unit (108), the transmitter being provided, to this end, with a switching unit (714, 717) that is arranged upstream of a physical layer signal processing unit (722) and where appropriate downstream of an MAC layer signal processing unit (719') in the transmitter.

AS. The receiver may further, to switch a unicast reception mode to a broadcast or multicast reception mode and vice versa, be provided with a switching unit (922) that is arranged downstream of a physical layer signal processing unit (906) and where appropriate upstream of an MAC layer signal processing unit (907') in the receiver.

The invention claimed is:

1. A transmitter network comprising: at least two transmitters which transmit in a same frequency range, wherein in a unicast-transmission mode of the transmitter, the transmitters are configured to transmit unicast information packets (UC) in subsequent first time intervals, wherein the at least two transmitters are further configured to simultaneously transmit in a broadcast mode or multicast mode, respectively, broadcast- or multicast information (BC/MC) in second time intervals that lie in between first time intervals, the broadcast information or multicast information, respectively, transmitted by the transmitters in a second time interval being substantially equal and being transmitted by the transmitters substantially time synchronous; and wherein at least one of the transmitters is configured to transmit a WLAN transmission signal, a serial data stream of the WLAN transmission signal comprising repeatedly occurring beacon frames, wherein some of the beacon frames comprise at least one of a first and a second codeword, which first codeword can have a first value indicating a unicast transmission mode of the transmitter, and can have a second value indicating the broadcast- or multicast transmission mode of the transmitter, respectively and that the second codeword is a measure of the length of a second time interval of a broadcast- or a multicast transmission mode and that the first and/or the second codeword is included in an EDCA (Enhanced Distributed Channel Access) parameter element in a beacon frame.

2. The transmitter network as claimed in claim 1, wherein the network has been integrated in a WiFi-network or WLAN-network.

3. The transmitter network as claimed in claim 1, wherein the at least two transmitters are synchronized in time with each other, so as to form a Single Frequency Network within the second time intervals.

4. The transmitter network as claimed in claim 3, wherein the at least two transmitters are synchronized in time with each other in accordance with the PTP Protocol (Precision Time Protocol).

5. The transmitter network as claimed in claim 1, wherein the second time intervals occur repeatedly in time.

6. The transmitter network as claimed in claim 5, wherein the second time intervals occur repeatedly at regular time instants in time.

7. The transmitter network as claimed in claim 6, wherein the lengths of the subsequent second time intervals are substantially equal to each other.

8. The transmitter network as claimed in claim 1, wherein in two subsequent first time intervals a first transmitter is configured to transmit an unicast information packet in a first time interval of the two subsequent first time intervals and the second transmitter is silent in this time interval, and the second transmitter is configured to transmit a unicast information packet in the second time interval of the two subsequent first time intervals and the first transmitter is silent in this time interval.

9. The transmitter network as claimed in claim 1, wherein the transmitter network is provided with a central control unit for controlling the transmitters in the transmitter network in a unicast transmission mode or in a broadcast- or multicast-transmission mode.

10. The transmitter network as claimed in claim 9, wherein the central control unit is configured to control the lengths of the subsequent second time intervals.

11. The transmitter network as claimed in claim 9, further comprising software or an app stored in an existing device for realizing the functioning of the central control unit.

12. The transmitter network as claimed in claim 9, wherein the central control unit is configured to control a plurality of transmitters such that the transmitters are synchronized in time with each other within the second time intervals so as to build a single frequency network.

13. The transmitter network as claimed in claim 1, wherein the first codeword is a 1-Bit codeword.

14. The transmitter network as claimed in claim 13, wherein a first 1-Bit codeword which equals '1' characterizes the broadcast- or multicast transmission mode of a transmitter.

15. The transmitter network as claimed in claim 14, wherein a first 1-Bit codeword which equals '0' characterizes the unicast transmission mode of a transmitter.

16. The transmitter network as claimed in claim 1, wherein the first and/or the second codeword is stored in an up to now unused bit combination in the EDCA (Enhanced Distributed Channel Access) Parameter Element.

17. The transmitter network as claimed in claim 1, wherein the EDCA parameter element comprises a partial parameter element (Parameter Record), the partial parameter element being one of the EDCA partial parameter elements already standardized in the WLAN standard specification IEEE802.11, and comprises the first codeword and/or the second codeword.

18. The transmitter network as claimed in claim 1, wherein the EDCA Parameter Element comprises an additional partial parameter element which comprises the first codeword and/or the second codeword.

19. The transmitter network as claimed in claim 1, wherein the second codeword an indicator signal and N time indicators, the time indicator(s) is (are) a measure for the length of a second time interval, N being equal to 1 or 2.

20. The transmitter network as claimed in claim 19, wherein N=2, the time indicators being a measure of the starting time and the end time, respectively, of a second time interval.

21. The transmitter network as claimed in claim 19, wherein certain beacon frames comprise an EDCA (Enhanced Distributed Channel Access) parameter element, which EDCA parameter element comprise at least one partial parameter element, and the at least one partial parameter element comprises the indicator signal of the second codeword, the N time indicators and the value, respectively, being accommodated in the transmission signal after the partial parameter element.

22. The transmitter network as claimed in claim 21, wherein the EDCA partial parameter element is a partial parameter element already standardized in the WLAN standard specification IEEE802.11.

23. The transmitter network as claimed in claim 21, wherein the at least one partial parameter element Is an additional partial parameter element comprised in the EDCA Parameter Element, the additional partial parameter element comprising the indicator signal of the second codeword.

24. The transmitter network as claimed in claim 1, wherein the second codeword comprises an indicator signal and a value, the value being a measure of the number of beacon frames comprised in the transmission signal, in a second time interval of the transmission signal.

25. The transmitter network as claimed in claim 1, wherein the transmitter is provided with a generating unit for generating the beacon frames provided with the first and/or the second codewords, the transmitter further being configured to combine the beacon frames with the unicast data or the broadcast-/multicast data to a serial data stream for transmission.

26. The transmitter network as claimed in claim 25, wherein the transmitter is further provided with a switching arrangement for switching between the unicast data and the broadcast data or the multicast data, respectively, in response to the control signal from the central control unit.

27. The transmitter network as claimed in claim 25, wherein the generating unit is configured to generate the beacon frames, and the transmitter is configured to combine the beacon frames with the unicast data or the broadcast-/multicast data, both in response to the control signal from the central control unit.

28. The transmitter network as claimed in claim 1, further comprising software or an app stored in an existing device for realizing the functioning of at least one transmitter.

29. The transmitter network as claimed in claim 1, wherein at least one transmitter is configured to switch over its transmission mode from a unicast transmission mode into a broadcast- or multicast transmission mode and vice versa, in dependence of a control signal supplied to the transmitter by a central control unit, that the at least one transmitter is thereto provided with a switching unit, which is accommodated before a physical layer signal processing unit and where appropriate after a MAC layer signal processing unit.

30. The transmitter network as claimed in claim 1, wherein the at least two transmitters, are synchronized in time with each other so as to realize a single frequency network within the second time intervals.

31. A receiver that can be used in a transmitter network:
wherein in a unicast-reception mode of the receiver, the receiver is configured to receive unicast information packets in subsequent first time intervals,
wherein the receiver is further configured to receive in a broadcast reception mode or a multicast reception mode, respectively, broadcast information or multicast information, respectively, received in second time intervals occurring in between the first time intervals; and
wherein for switching a unicast reception mode into a broadcast- or multicast reception mode and vice versa, the receiver is provided with a switching unit, which is accommodated in the receiver after a physical layer signal processing unit and before a MAC layer signal processing unit.

32. The receiver as claimed in claim 31, wherein the receiver is configured to store the unicast information packets received in the first time intervals in a first buffer memory and to store the broadcast information or the multicast information, respectively, received in the second time intervals in a second buffer memory.

33. The receiver as claimed in claim 31, further configured to receive from a transmitter in the transmitter network a WLAN transmission signal, wherein in a serial datastream of the WLAN transmission signal beacon frames occur repeatedly, wherein certain beacon frames comprise at least one of a first and a second codeword, which first codeword characterizes a transmission mode of a transmitter and the second codeword is a measure for the length of a second time interval of a broadcast transmission mode or a-multicast transmission mode, respectively, that the first and/or the second codeword are included in an EDCA (Enhanced Distributed Channel Access) parameter element in a beacon frame, and the receiver being provided with a detector arrangement for detecting the first and/or the second codeword from the EDCA parameter element.

34. The receiver as claimed in claim 33, wherein the first codeword can have a first value indicating the unicast transmission mode of the transmitter, or has a second value indicating the broadcast-transmission mode or multicast transmission mode of the transmitters, and that the receiver is configured to switch into a unicast reception mode upon detection of the first value of the first codeword, and to switch into a broadcast- or multicast reception mode upon detection of the second value of the first codeword.

35. The receiver as claimed in claim 34, wherein the first codeword is a 1-Bit codeword, and the receiver is configured to switch into a unicast reception mode upon detection of a '0' value of the first codeword, and for switching into a broadcast- or multicast reception mode upon detection of a '1' value of the first codeword.

36. The receiver as claimed in claim 33, wherein the receiver comprises a detector arrangement for detecting the second codeword and the receiver being configured to, in dependence of the value of the detected second codeword, switch-off the broadcast- or multicast reception mode.

37. The receiver as claimed in claim 36, wherein the receiver is provided with a counter and the receiver is further configured to store the second codeword as a count value in the counter.

38. The receiver as claimed in claim 37, wherein the counter is configured to count down its count value, as of the moment of switching the reception mode into the broadcast- or multicast reception mode, and the receiver is further configured to switch its reception mode from the broadcast- or multicast reception mode into the unicast reception mode upon the count value in the counter reaching the zero value.

39. The receiver as claimed in claim 33, wherein certain beacon frames comprise an EDCA parameter element, which EDCA parameter element comprises the first codeword and/or the second codeword, the detector arrangement being configured to detect the first codeword and/or the second codeword from the EDCA parameter element.

40. The receiver as claimed in claim 39, wherein the EDCA parameter element comprises a partial parameter element, the partial parameter element being one of the EDCA partial parameter elements already standardized in the WLAN standard specification IEEE802.11, and comprises the first codeword and/or the second codeword, the detector arrangement being configured to detect the first codeword and/or the second codeword from the EDCA partial parameter element.

41. The receiver as claimed in claim 39, wherein the EDCA Parameter Element comprises an additional partial parameter element which comprises the first codeword and/or the second codeword, the detector arrangement being configured to detect the first codeword and/or the second codeword from the additional partial parameter element.

42. The receiver as claimed in claim 33, wherein the second codeword characterizes the length of a second time interval of a broadcast- or multicast transmission mode.

43. The receiver as claimed in claim 33, wherein the second codeword comprises an indicator signal and two time indicators, the time indicators being a measure for the starting time and stop time, respectively, of a second time interval, and the receiver being configured to detect the indicator signal and in response thereto retrieve the two time indicators from the received transmission signal.

44. The receiver as claimed in claim 33, wherein the second codeword comprises an indicator signal and a value, the value being a measure for the number of beacon frames in the transmission signal received in a second time interval, and the receiver is configured to detect the indicator signal and in response thereto retrieve the value from the received transmission signal.

45. The receiver as claimed in claim 33, wherein the first and/or the second codeword is stored in an up to now unused bit combination in the EDCA parameter element, the receiver further being configured to retrieve the first and/or second codeword from the up to now unused bit combination in the EDCA parameter element.

46. A system comprising:
a receiver that can be used in a transmitter network:
wherein in a unicast-reception mode of the receiver, the receiver is configured to receive unicast information packets in subsequent first time intervals,
wherein the receiver is further configured to receive in a broadcast reception mode or a multicast reception mode, respectively, broadcast information or multicast information, respectively, received in second time intervals occurring in between the first time intervals; and
wherein for switching a unicast reception mode into a broadcast- or multicast reception mode and vice versa, the receiver is provided with a switching unit, which is accommodated in the receiver after a physical layer signal processing unit and before a MAC layer signal processing unit; and
software or App that controls operation of the receiver.

* * * * *